(12) United States Patent
Cho et al.

(10) Patent No.: US 10,534,440 B2
(45) Date of Patent: Jan. 14, 2020

(54) VEHICLE DISPLAY DEVICE AND VEHICLE

(71) Applicant: LG ELECTRONICS INC., Seoul (KR)

(72) Inventors: Youngjun Cho, Seoul (KR); Jinho Youn, Seoul (KR); Munchae Joung, Seoul (KR); Sunuk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/741,206

(22) PCT Filed: Dec. 16, 2015

(86) PCT No.: PCT/KR2015/013830
§ 371 (c)(1),
(2) Date: Apr. 5, 2018

(87) PCT Pub. No.: WO2017/003053
PCT Pub. Date: Jan. 5, 2017

(65) Prior Publication Data
US 2018/0217670 A1    Aug. 2, 2018

(30) Foreign Application Priority Data
Jun. 30, 2015  (KR) .................. 10-2015-0093400

(51) Int. Cl.
*G06F 3/01*    (2006.01)
*G06F 3/042*   (2006.01)
*B60R 16/023*  (2006.01)
*B60K 37/06*   (2006.01)

(52) U.S. Cl.
CPC ........... *G06F 3/017* (2013.01); *B60R 16/023* (2013.01); *G06F 3/0421* (2013.01); *B60K 37/06* (2013.01); *B60Y 2200/11* (2013.01); *B60Y 2400/92* (2013.01); *G09G 2380/10* (2013.01)

(58) Field of Classification Search
None
See application file for complete search history.

(56) References Cited

U.S. PATENT DOCUMENTS

2013/0141395 A1*  6/2013  Holmgren ............. G06F 3/0421
                                                        345/175
2014/0152551 A1   6/2014  Mueller et al.
2017/0083216 A1*  3/2017  Wild .................... B60K 37/06

FOREIGN PATENT DOCUMENTS

| JP | 2013513179 | 4/2013 |
|---|---|---|
| KR | 1020100068222 | 6/2010 |
| KR | 1020110062062 | 6/2011 |
| KR | 1020110101501 | 9/2011 |
| KR | 1020140118610 | 10/2014 |
| KR | 1020140120650 | 10/2014 |

* cited by examiner

*Primary Examiner* — Brian M Butcher
(74) *Attorney, Agent, or Firm* — Fish & Richardson P.C.

(57) ABSTRACT

The present invention relates to a vehicle display device comprising: a display; a gesture sensing unit disposed in the vicinity of the display so as to generate a first sheet beam to be emitted in a first direction and a second sheet beam to be emitted in a second direction different from the first direction, and sensing a three-dimensional gesture of an object through the first and second sheet beams; and a processor for providing a control signal according to the three-dimensional gesture.

17 Claims, 24 Drawing Sheets

【FIG. 1】
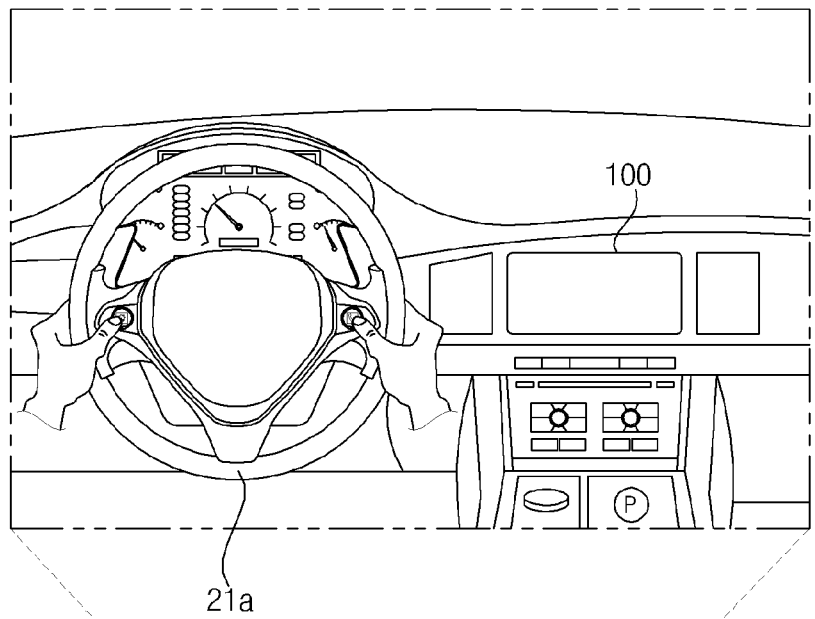
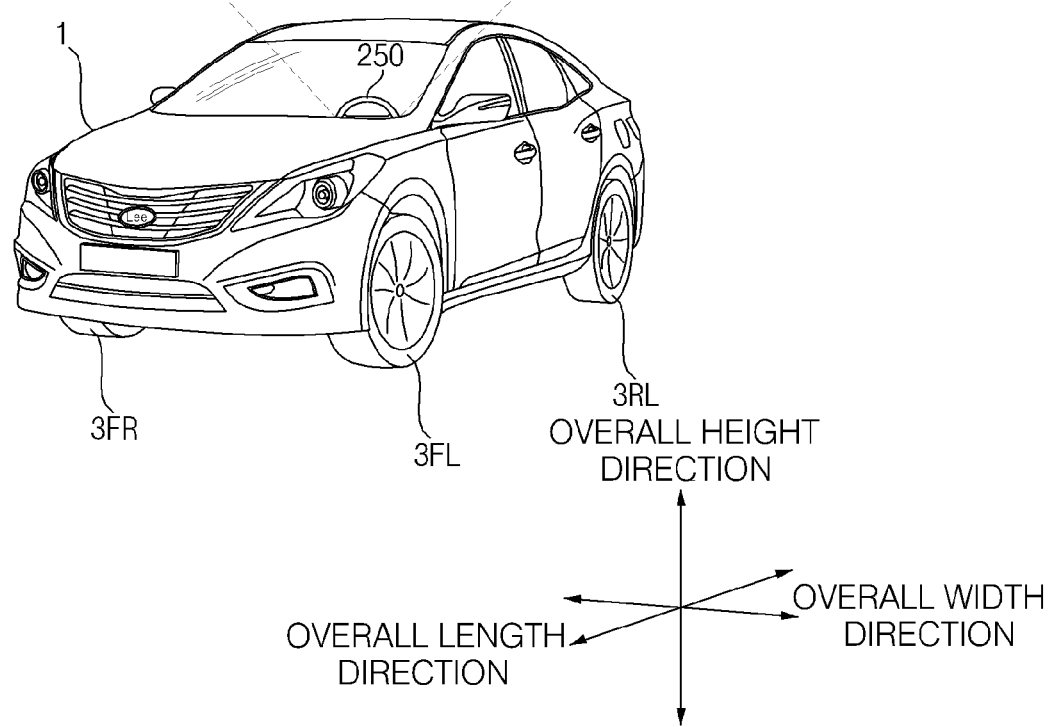

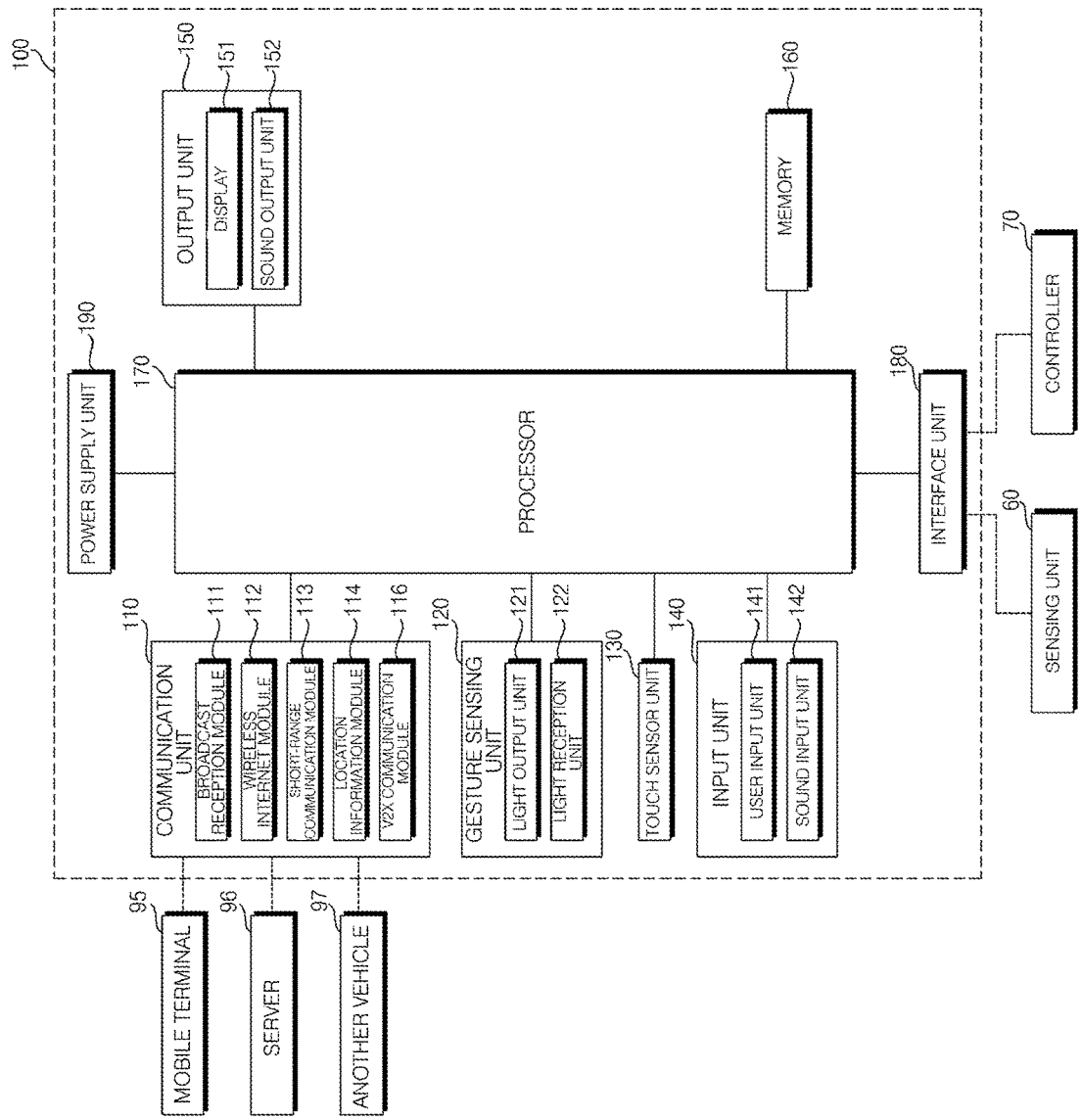
[FIG. 2]

[FIG. 3A]
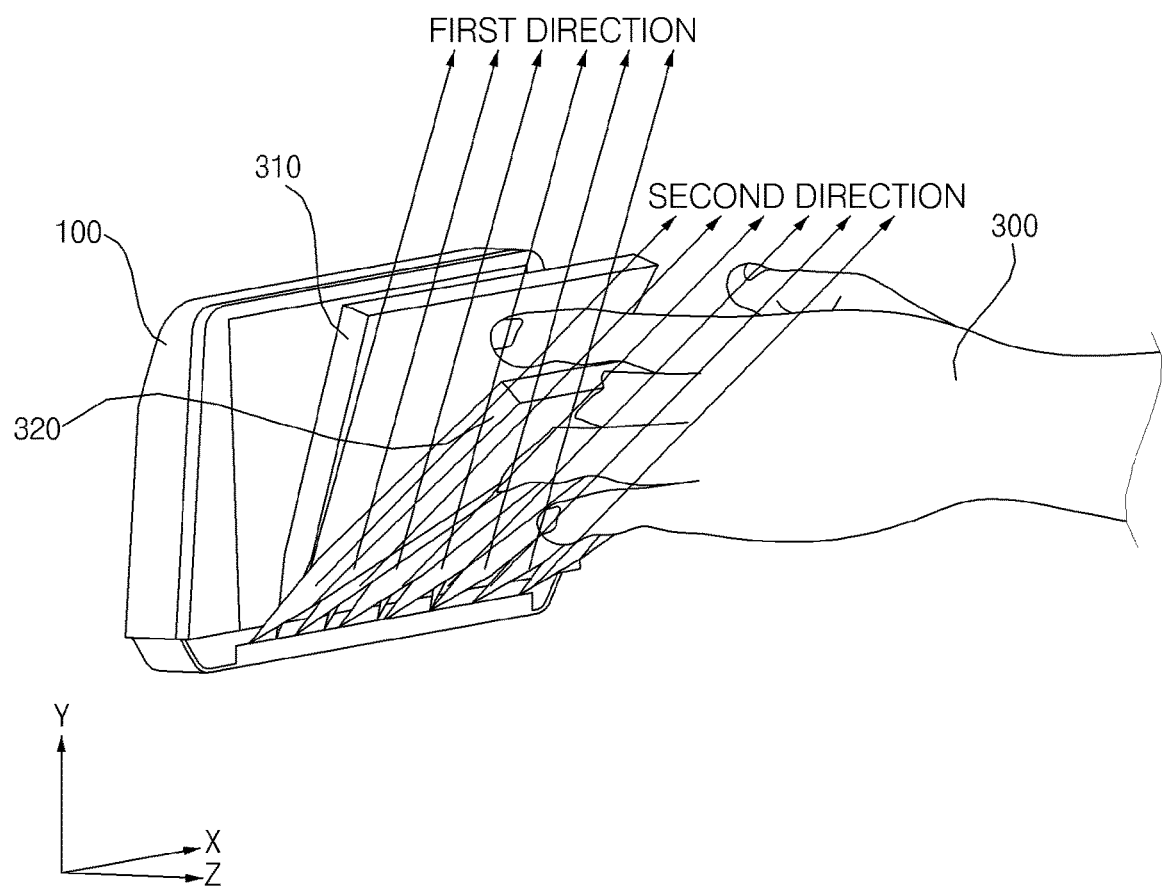

[FIG. 3B]
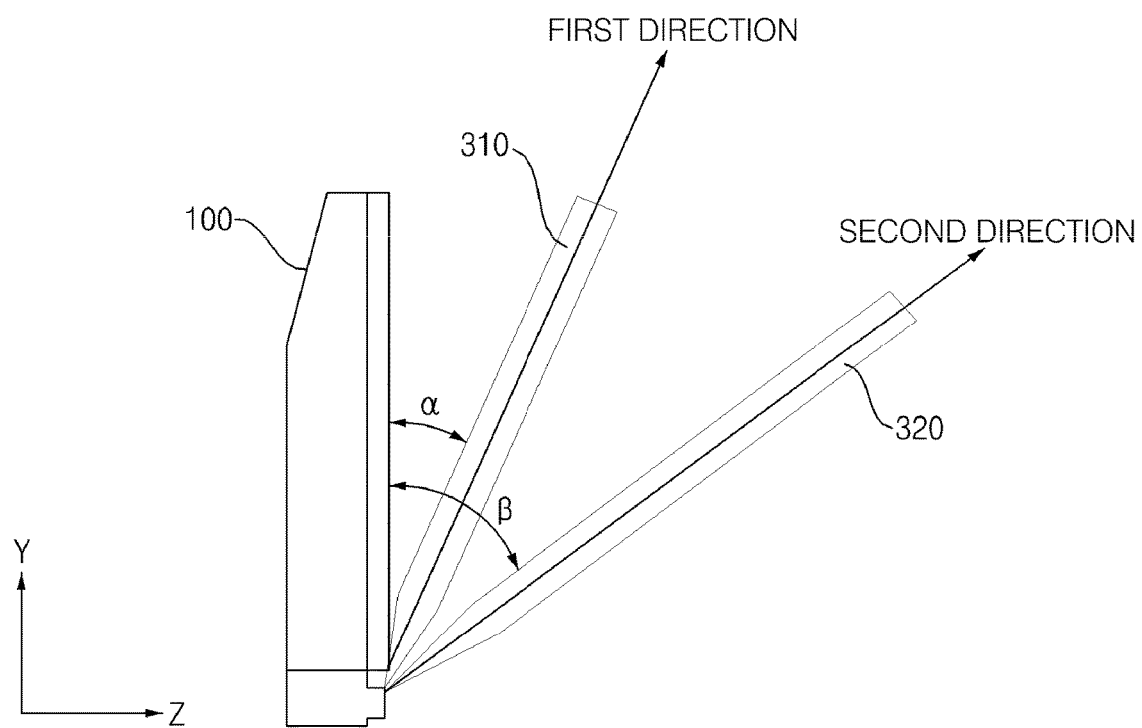

[FIG. 4A]
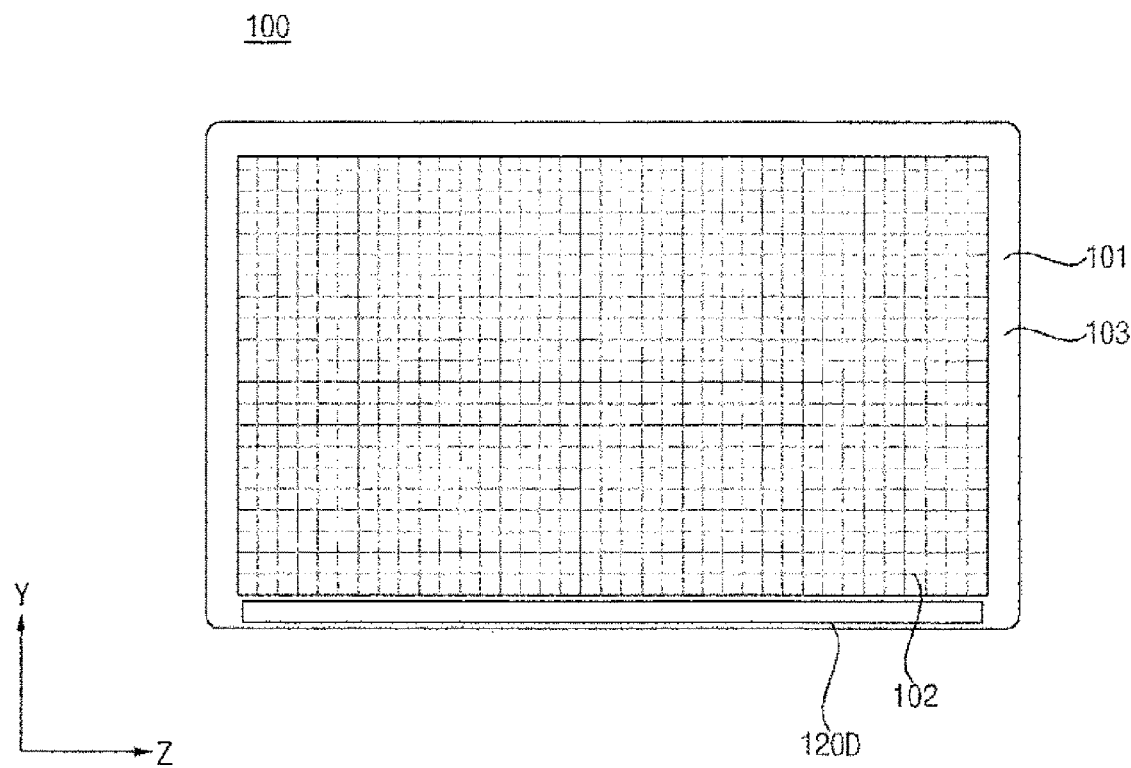

[FIG. 4B]
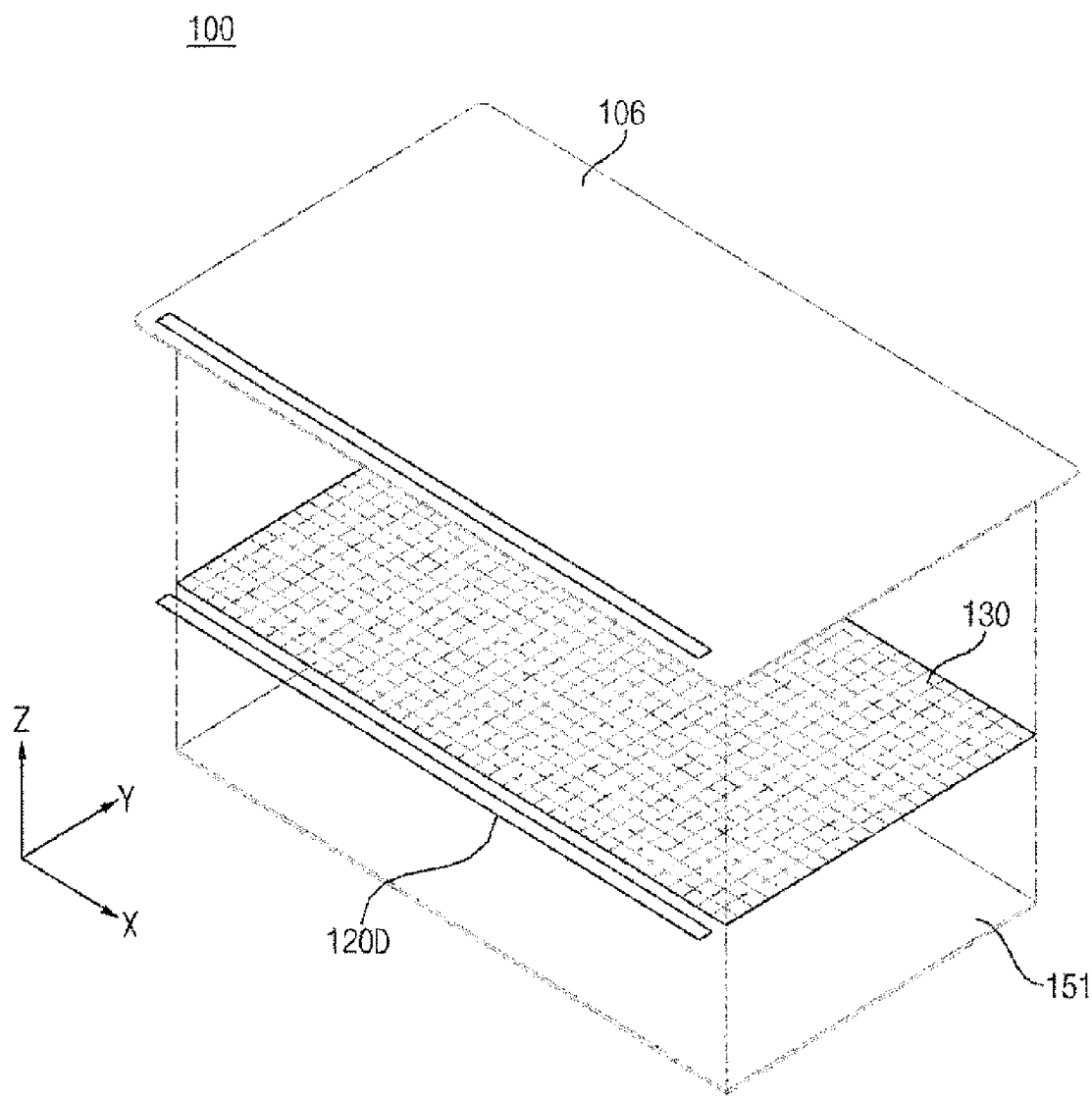

[FIG. 4C]
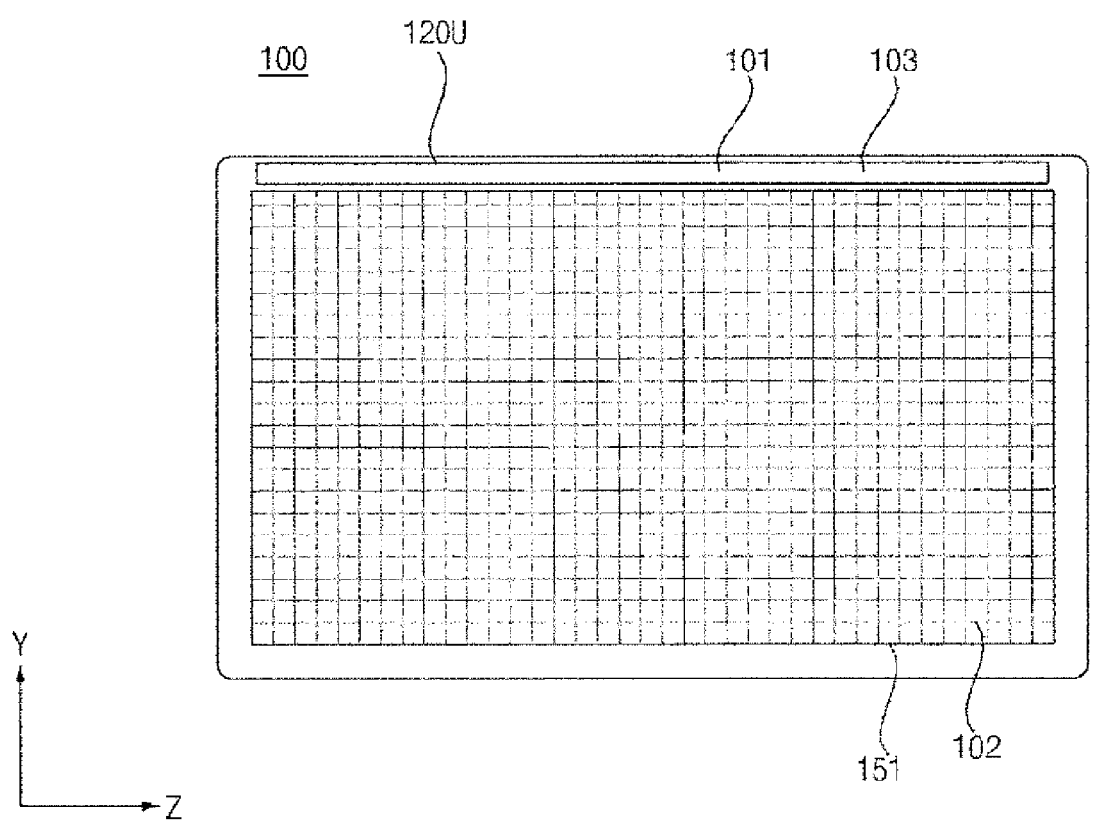

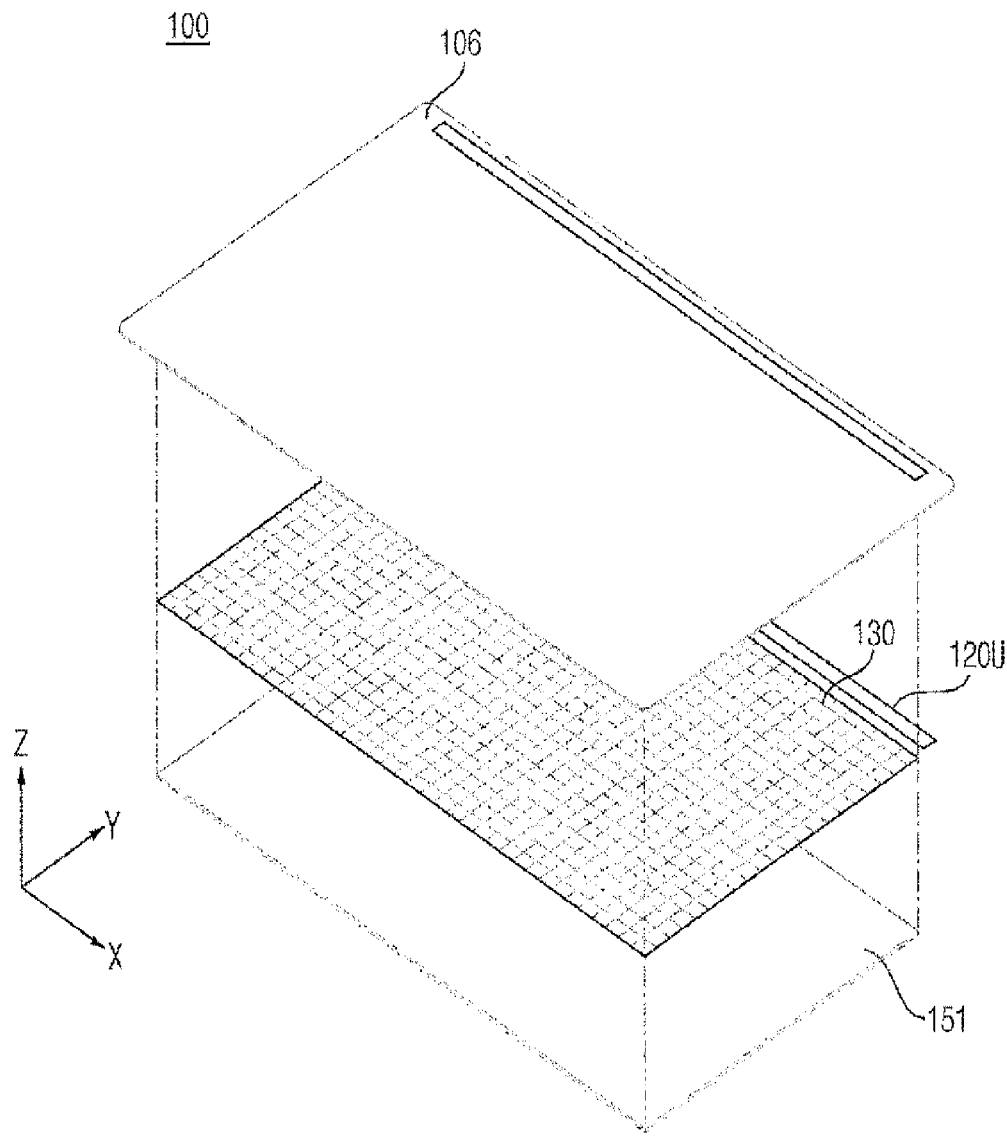
[FIG. 4D]

[FIG. 4E]
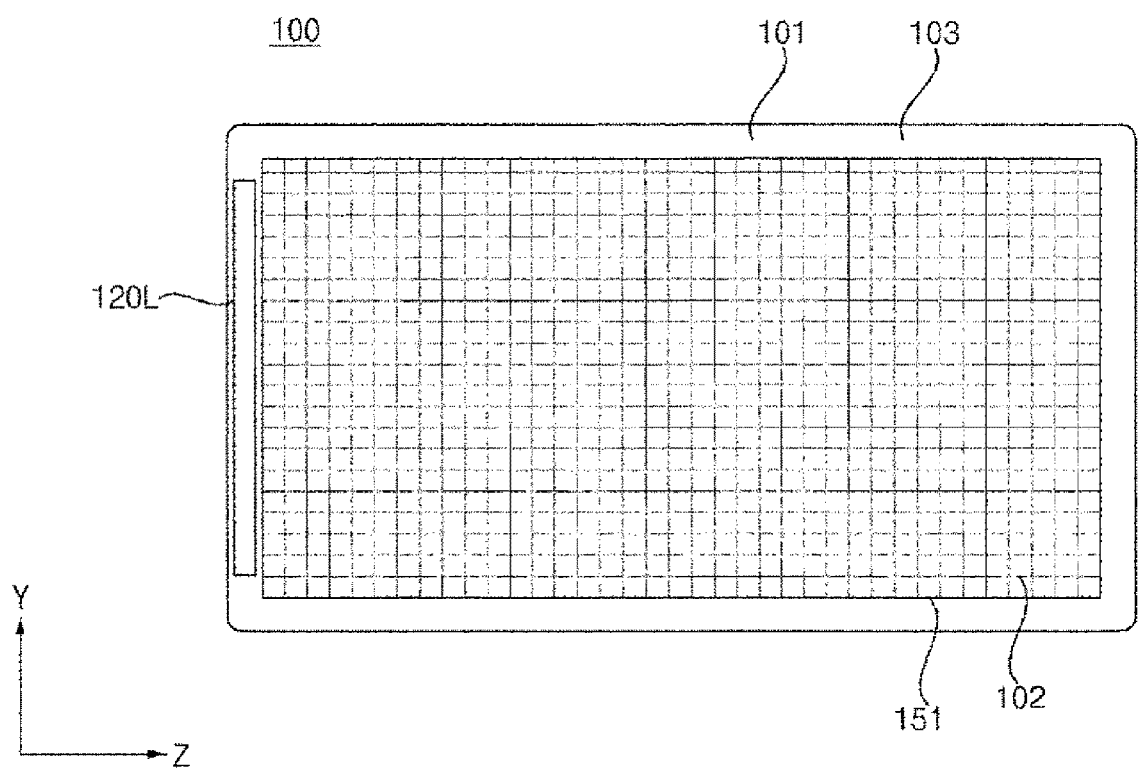

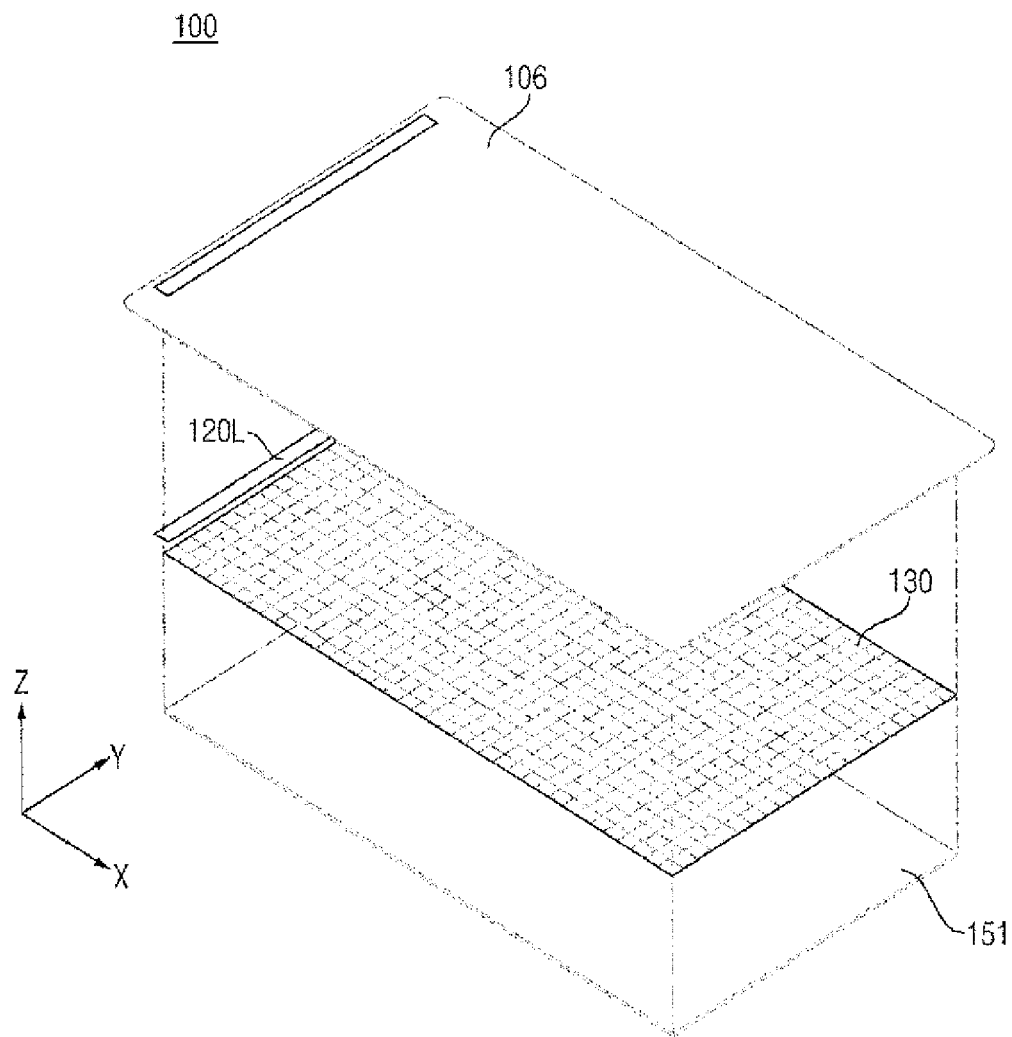
[FIG. 4F]

[FIG. 4G]
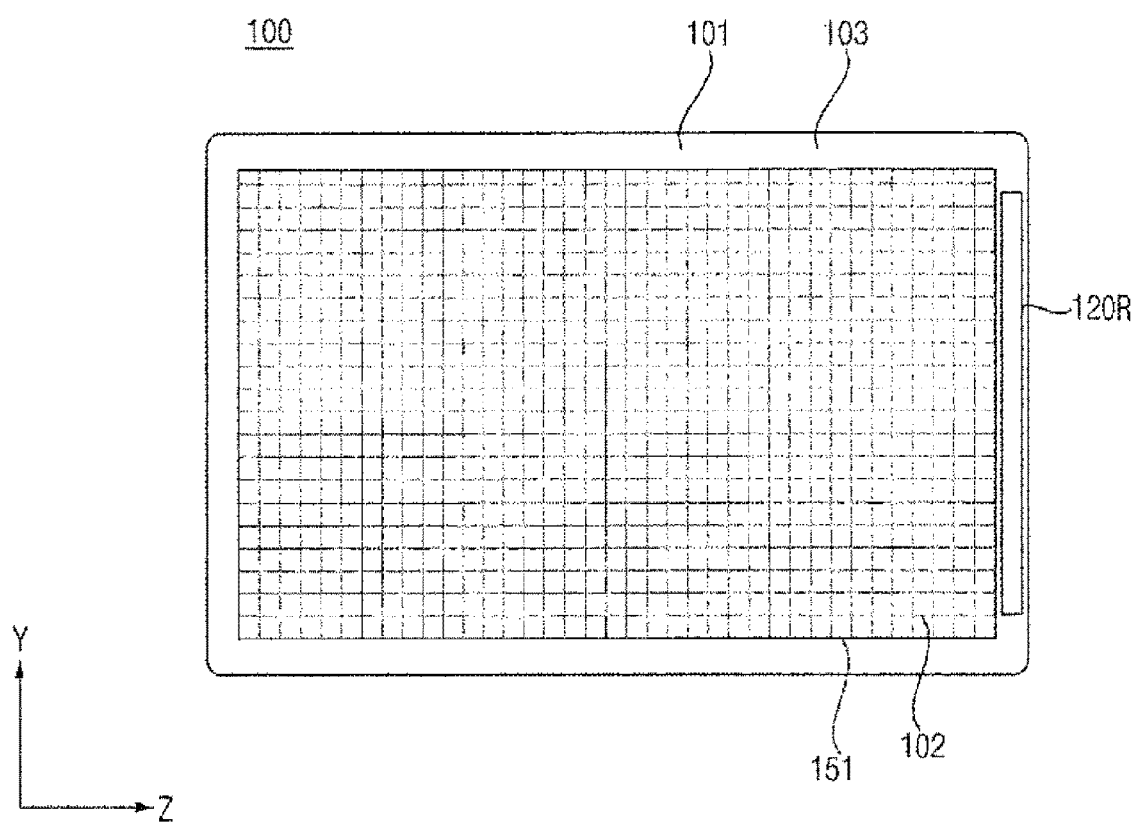

[FIG. 4H]
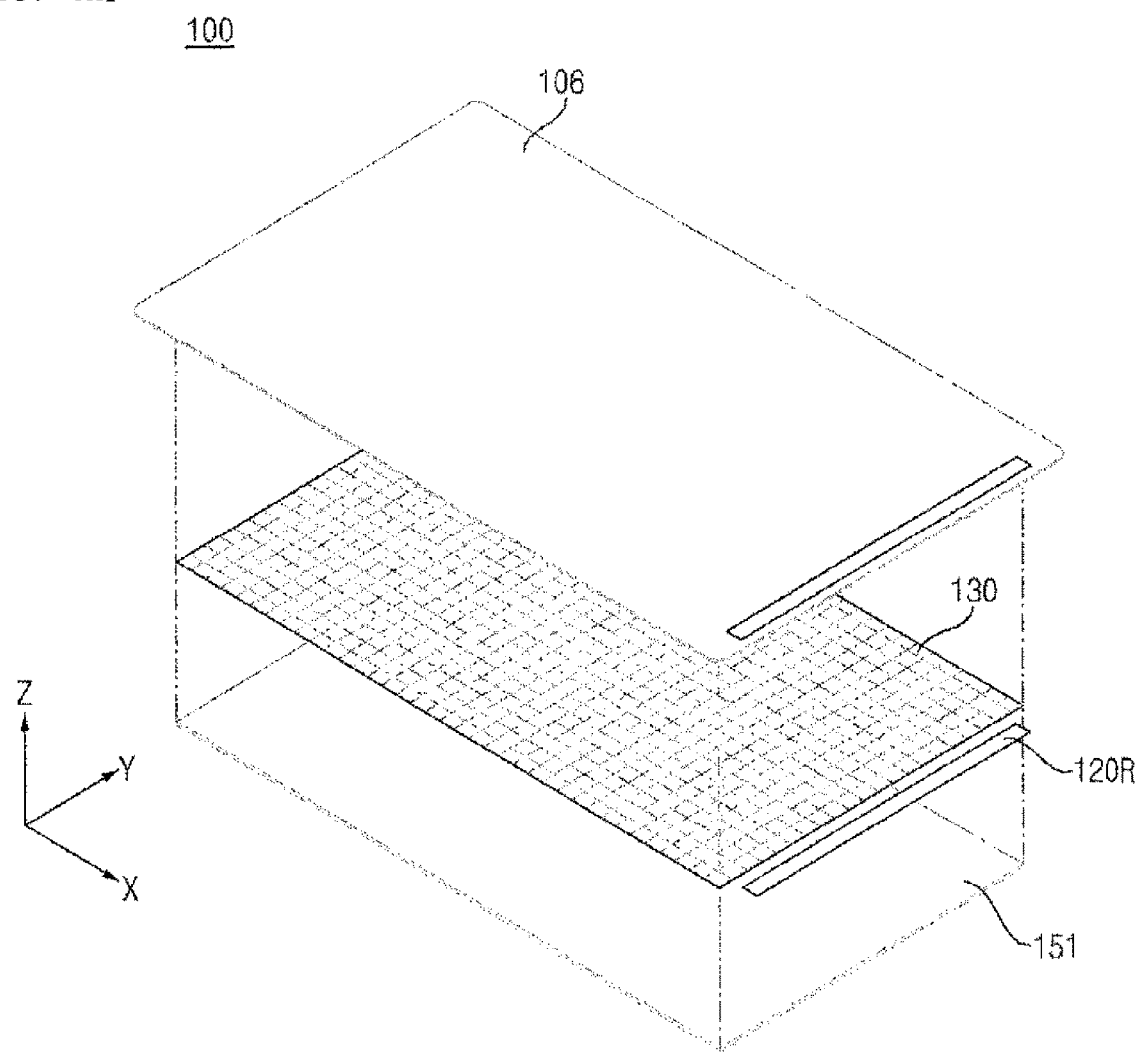

[FIG. 5A]
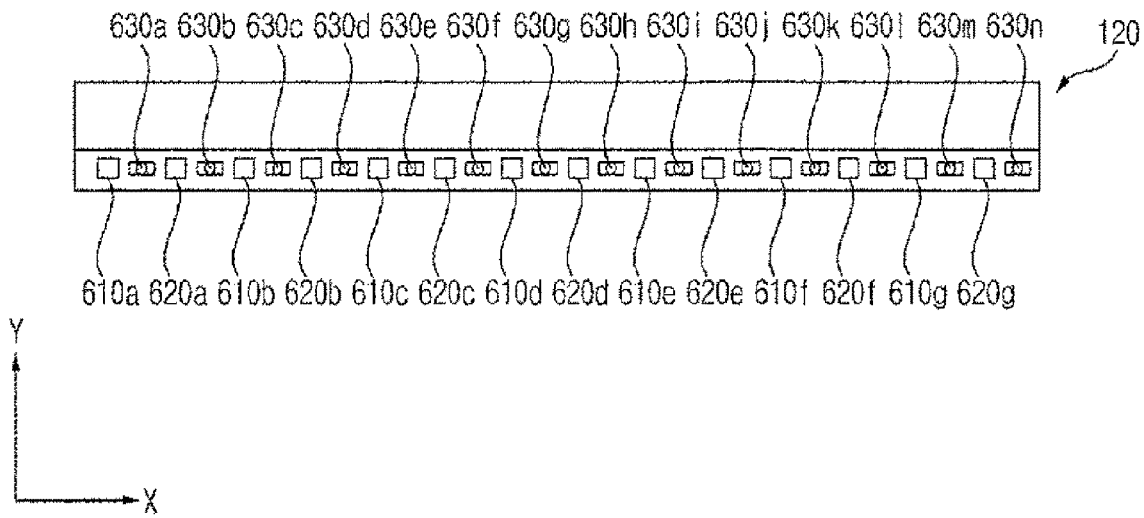
[FIG. 5B]
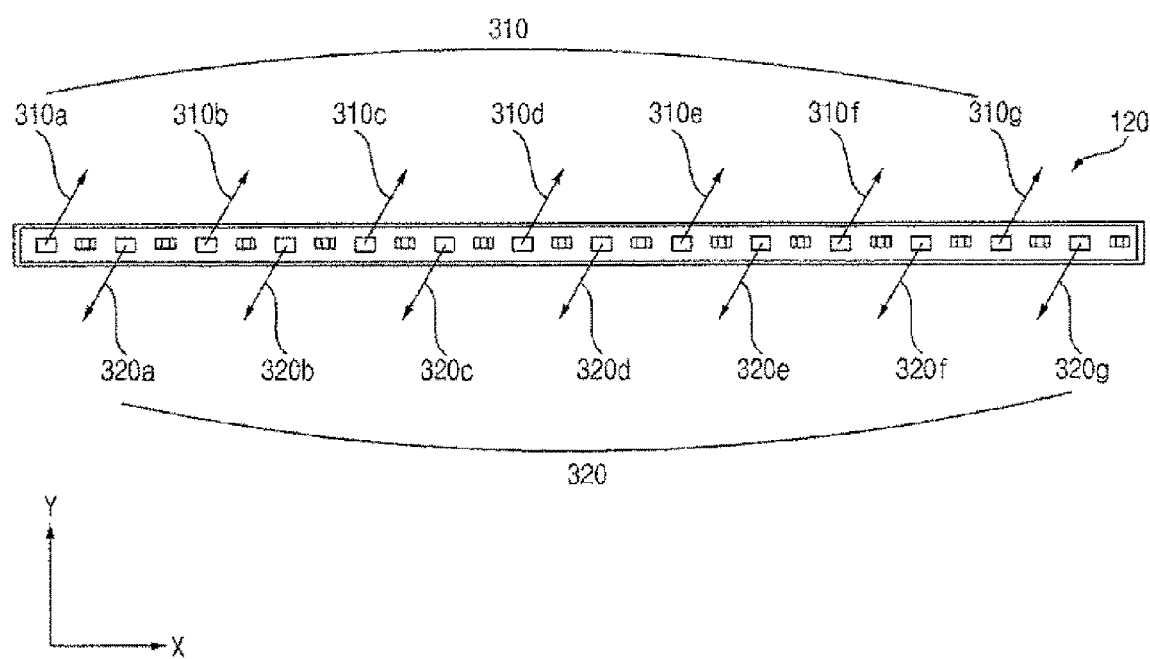

[FIG. 6A]
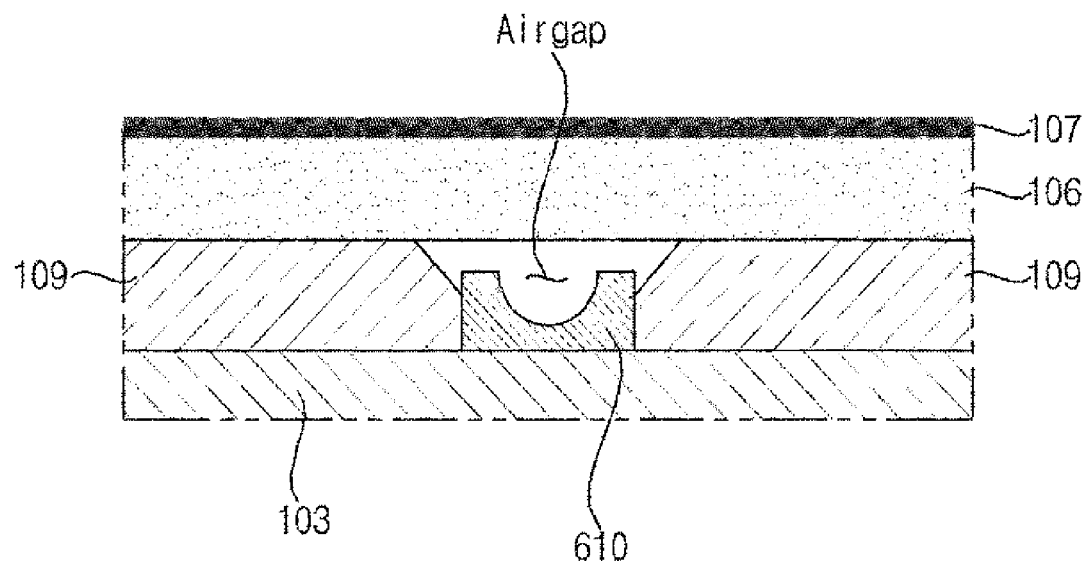
[FIG. 6B]
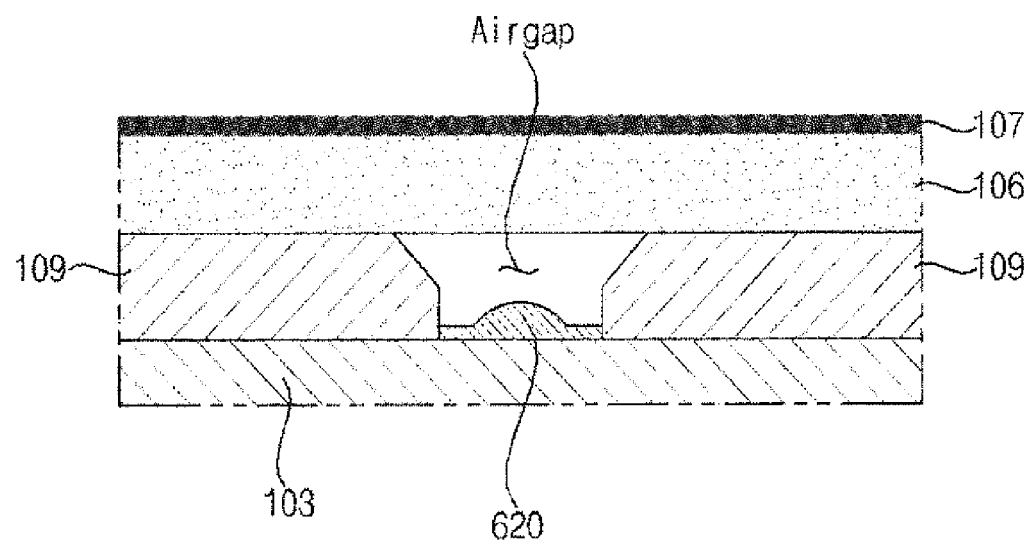

[FIG. 7]
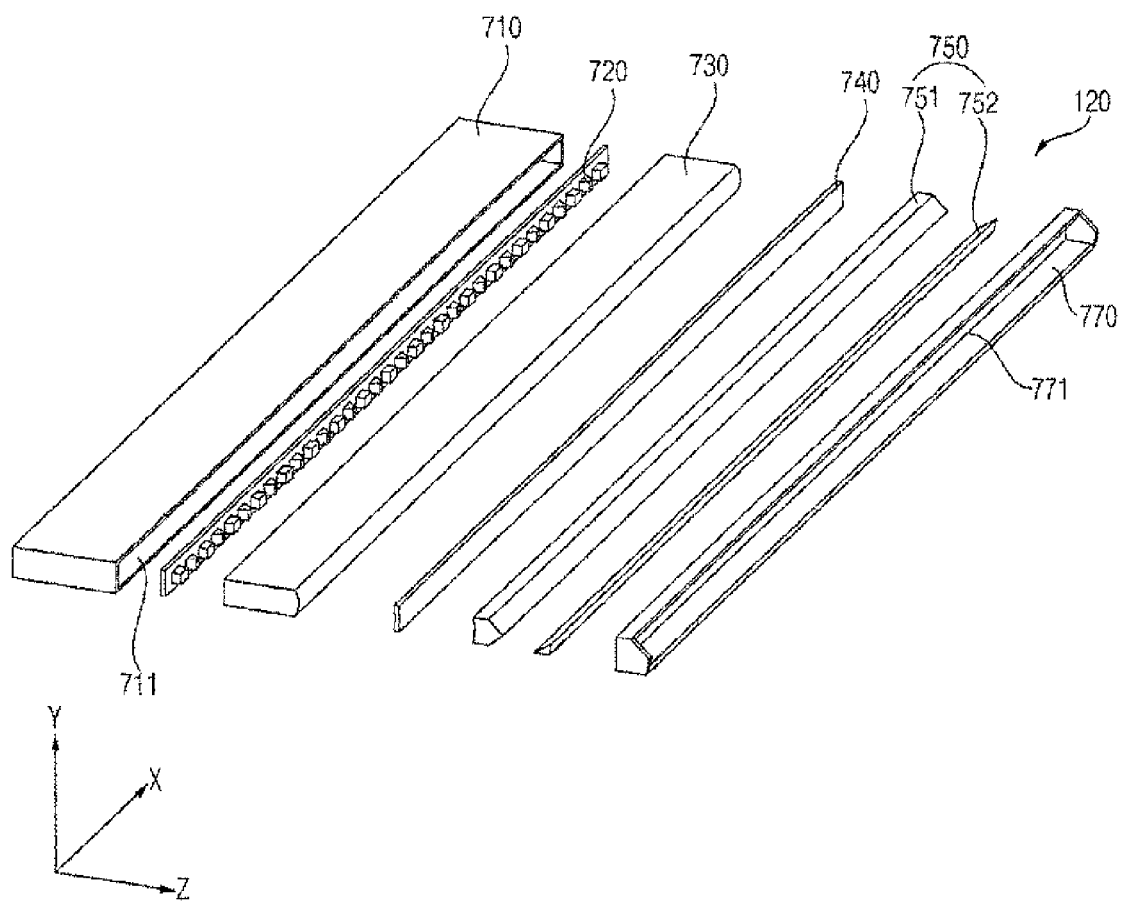

[FIG. 8]
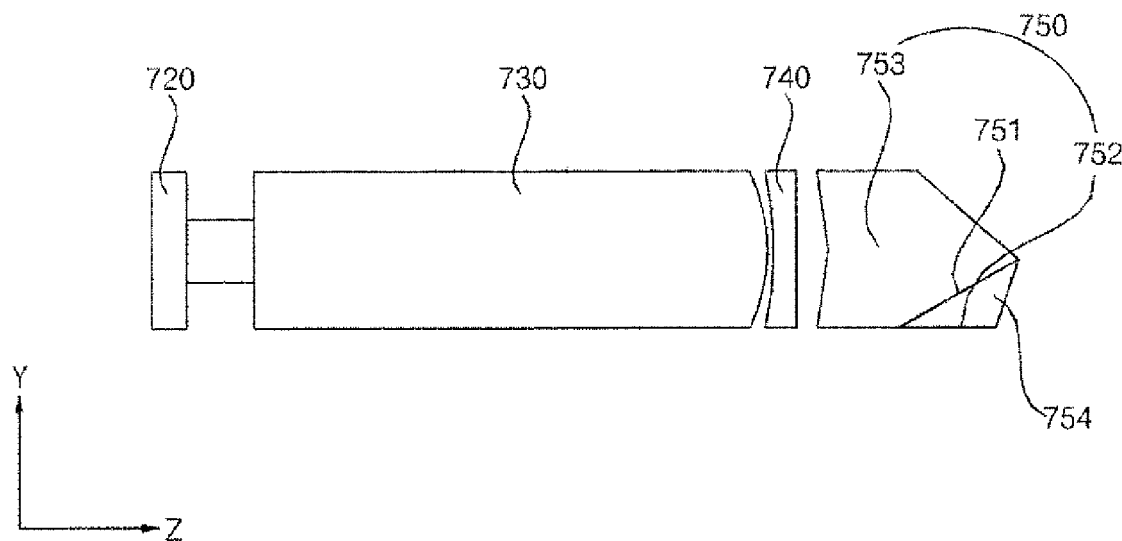
[FIG. 9]
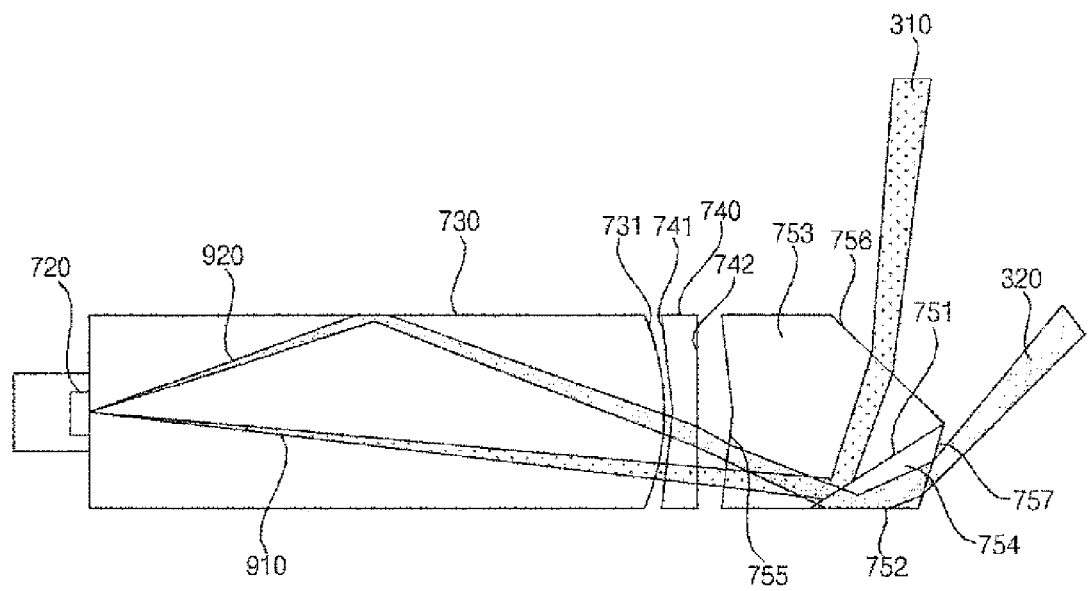

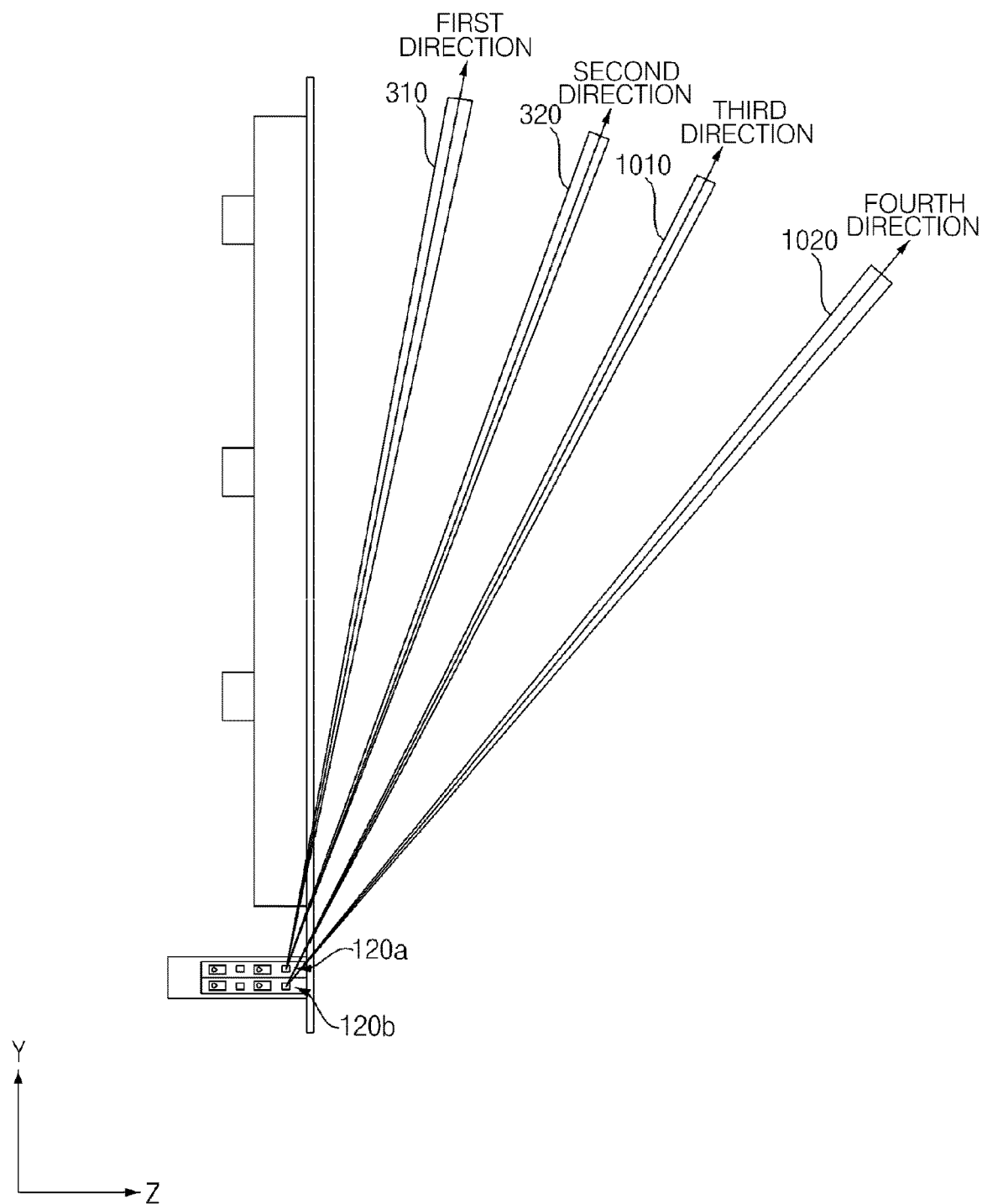
[FIG. 10]

【FIG. 11】
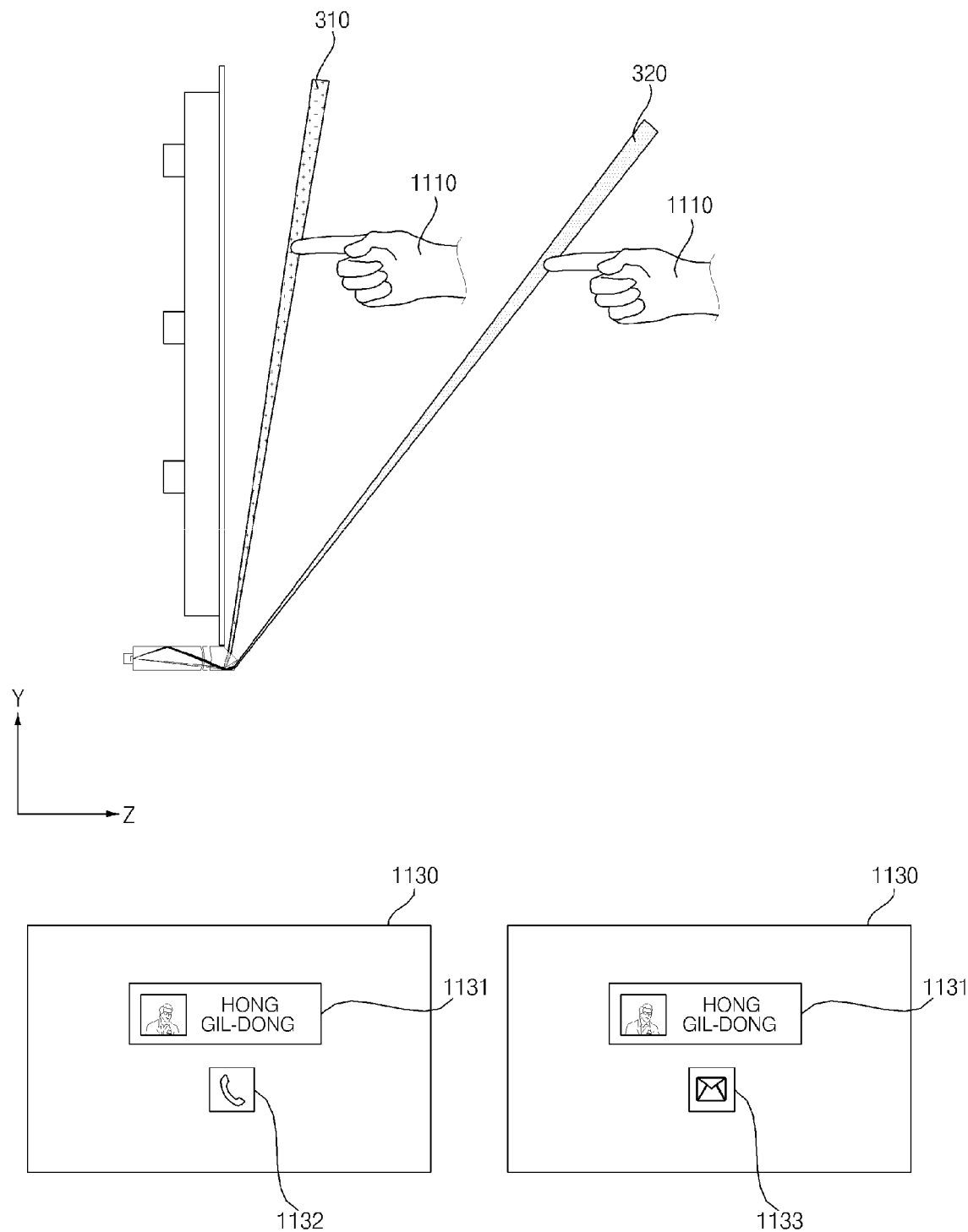

[FIG. 12]
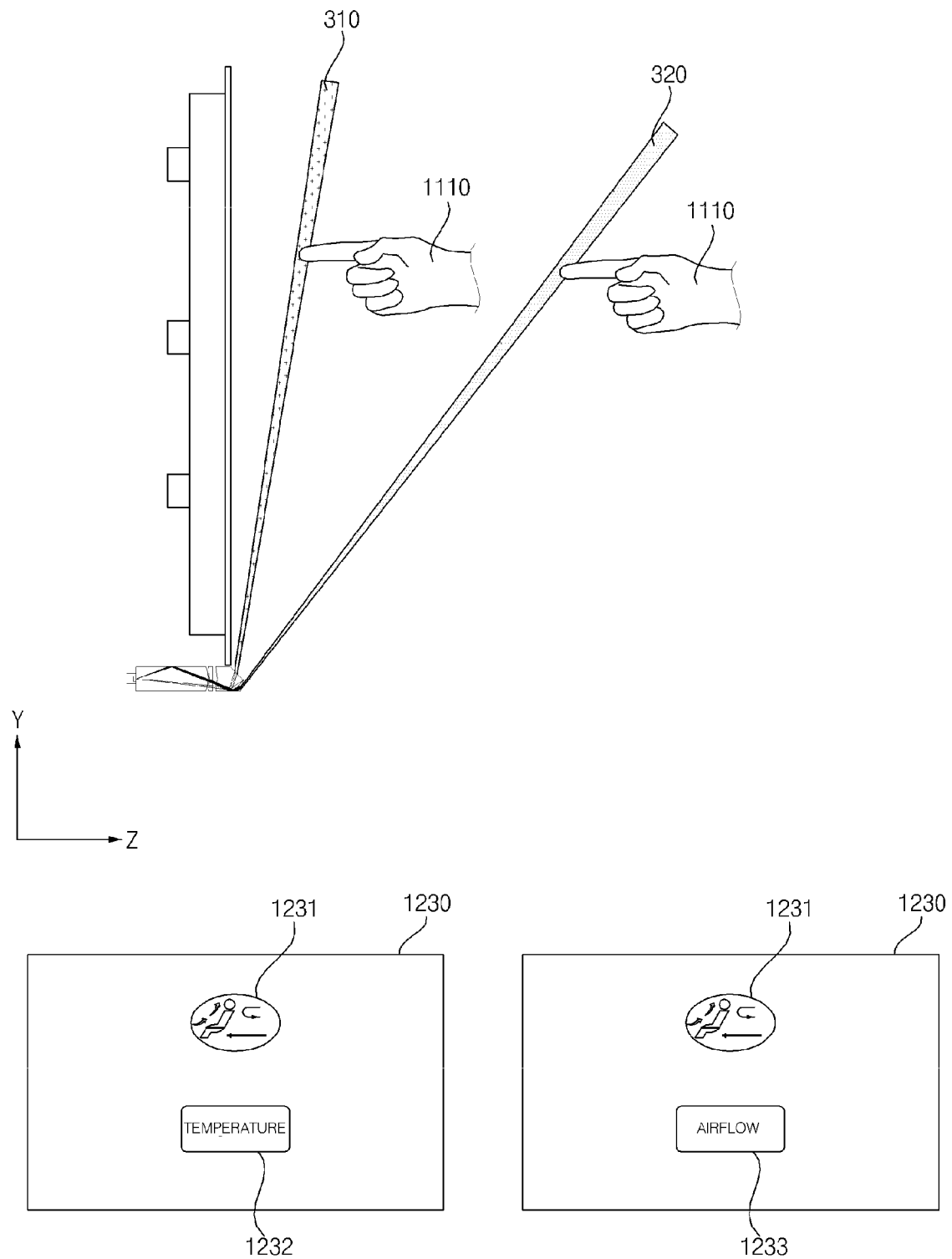

[FIG. 13]
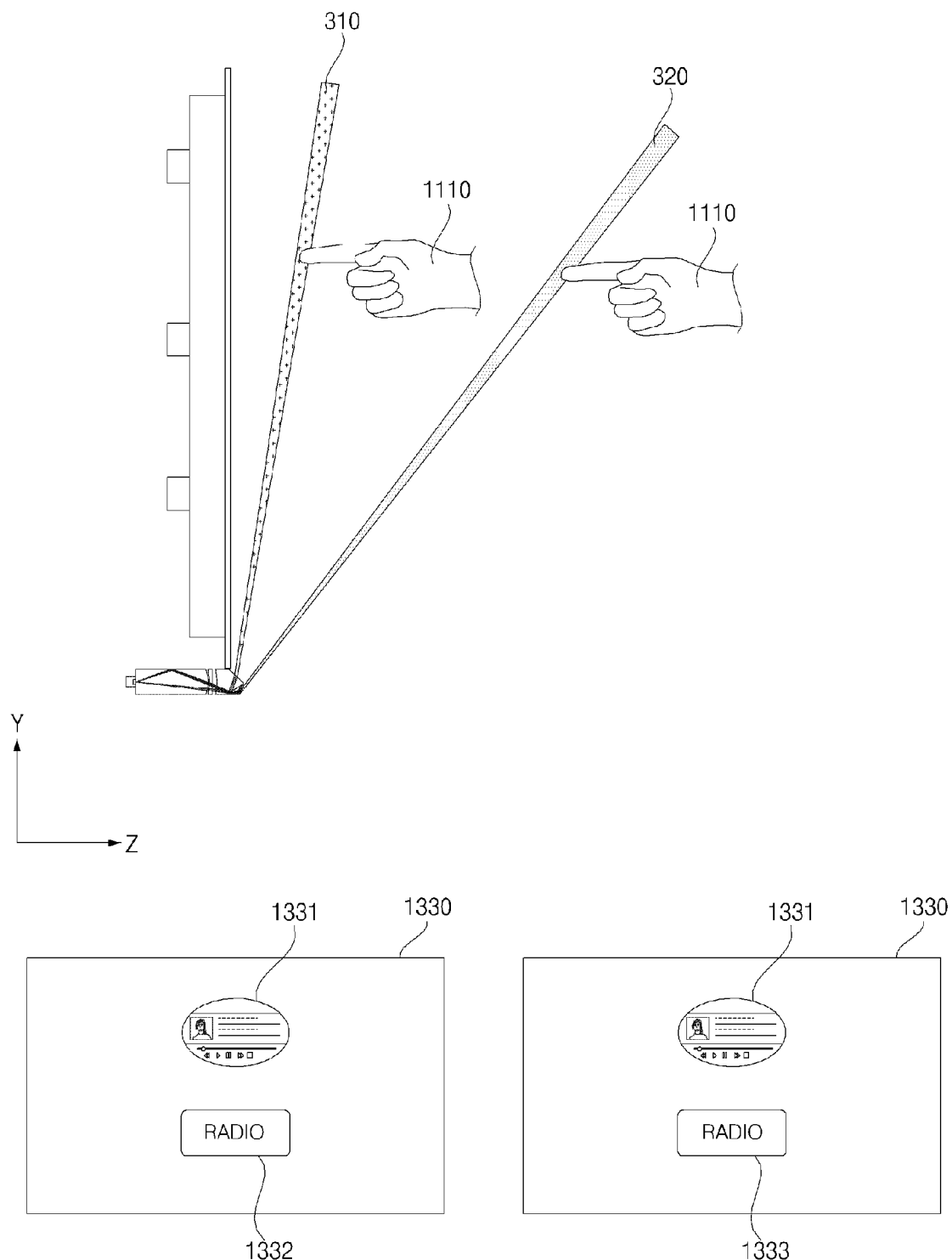

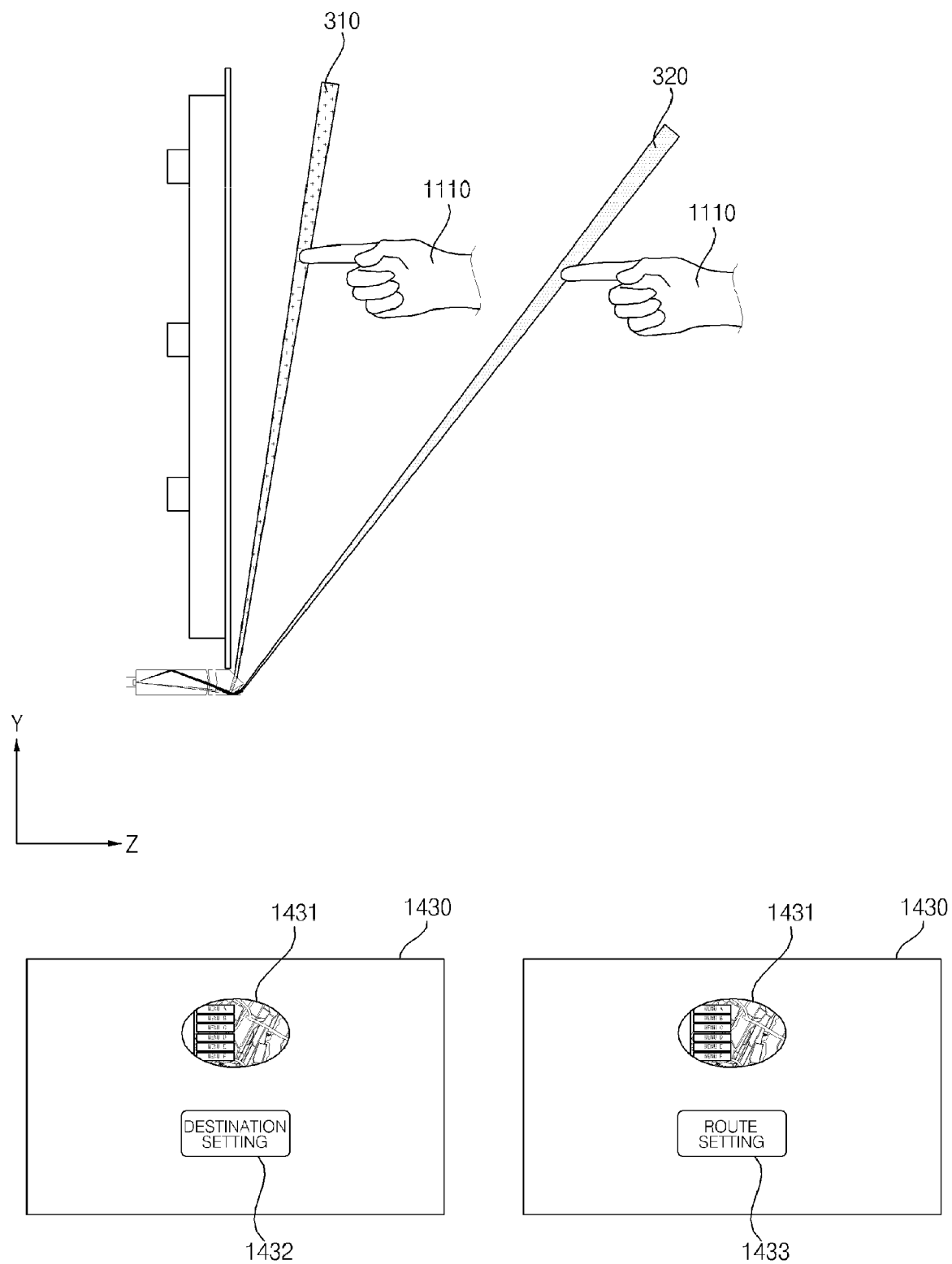
[FIG. 14]

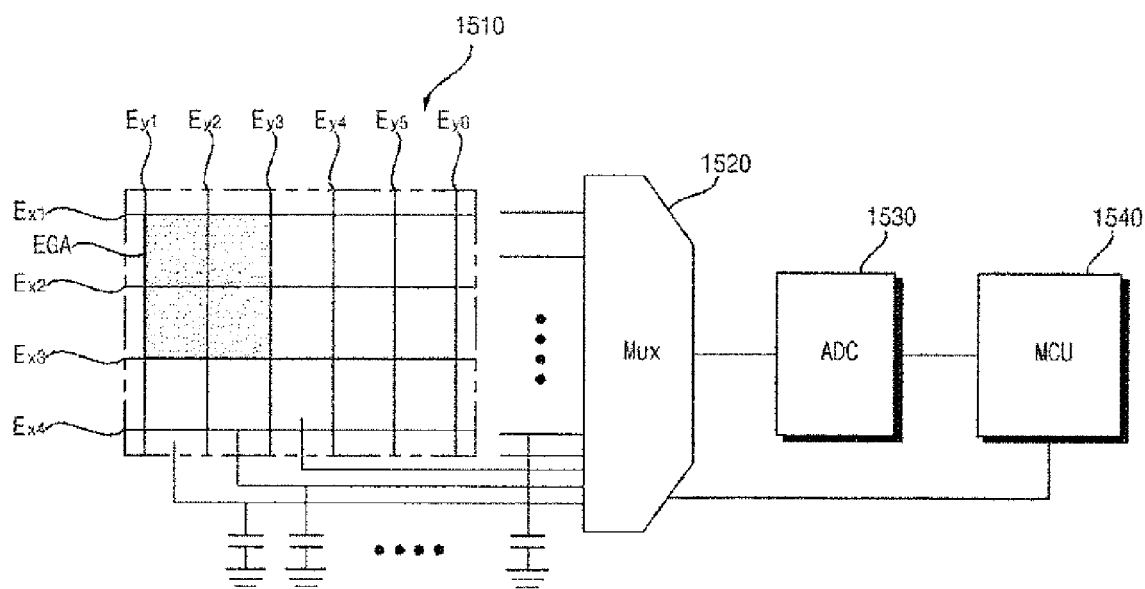
[FIG. 15A]

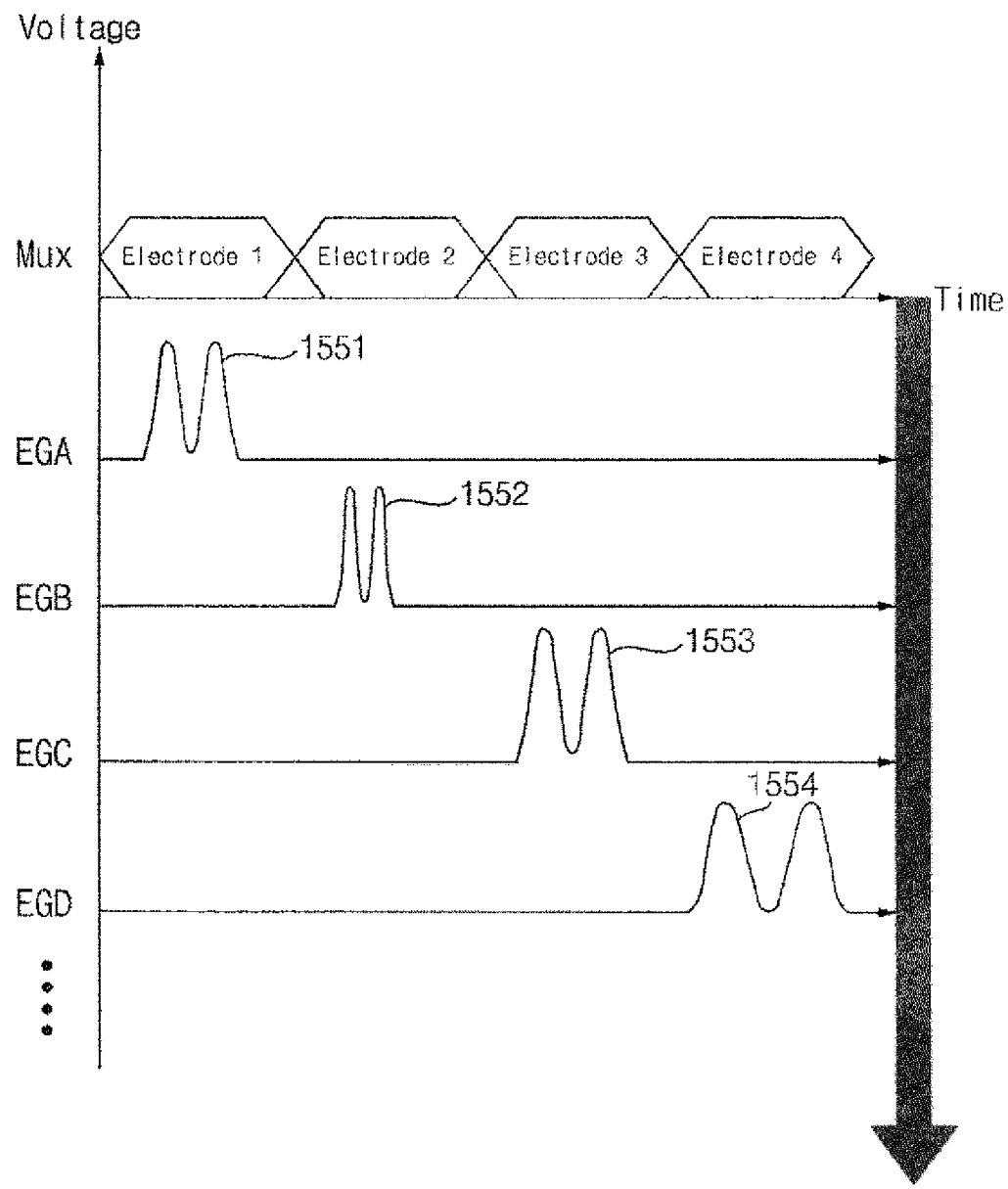
[FIG. 15B]

[FIG. 16]
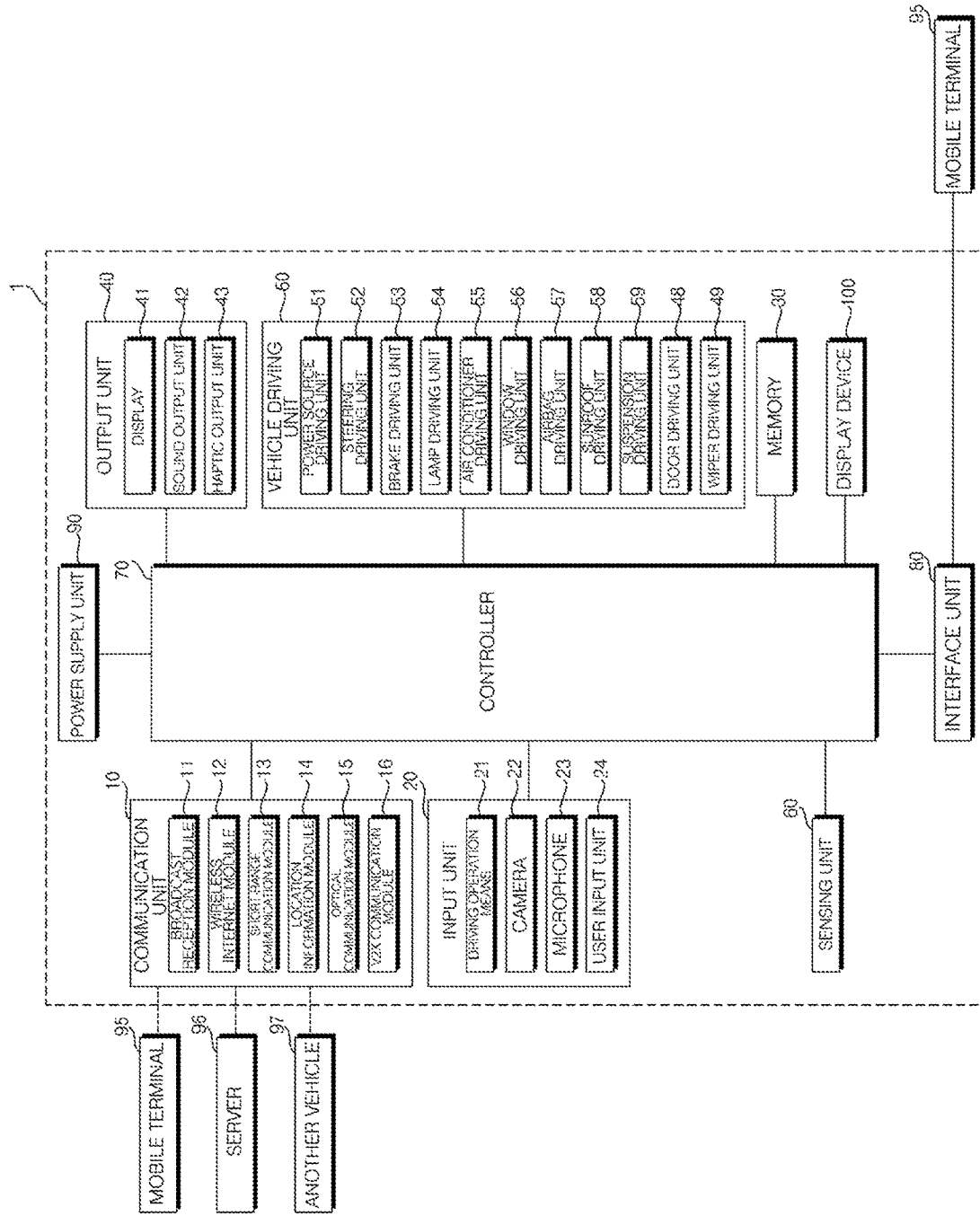

VEHICLE DISPLAY DEVICE AND VEHICLE

CROSS-REFERENCE TO RELATED APPLICATIONS

This application is a National Stage application under 35 U.S.C. § 371 of International Application No. PCT/KR2015/013830, filed Dec. 16, 2015, which claims the benefit of an earlier filing date and right of priority to Korean Patent Application No. 10-2015-0093400, filed in the Korean Intellectual Property Office on Jun. 30, 2015. The disclosures of the prior applications are incorporated by reference in their entirety.

TECHNICAL FIELD

The present invention relates to a vehicle display device and a vehicle including the vehicle display device.

BACKGROUND ART

A vehicle is an apparatus that moves in a direction desired by a user riding therein. A representative example of a vehicle may be an automobile.

Meanwhile, various kinds of research on a display device that provides various kinds of information for users riding in a vehicle have been conducted.

Due to recent development of touch technology and three-dimensional (3D) technology, research on technology that is capable of performing 3D interaction has been actively carried out.

Meanwhile, 3D interaction is technology that is capable of sensing a Z-axis input in addition to sensing of an X-axis input and a Y-axis input, which is performed by a conventional touch sensor. In recent years, efforts to realize proximity touch or space recognition based on cameras or ultrasonic waves in vehicles have been made.

For example, Korean Patent Application Publication No. 10-2002-0058308 discloses a portable device including a display that is capable of sensing the motion of a user. In particular, this publication discloses that a proximity input is sensed by a proximity sensor and a touch input is sensed by a touch sensor.

In the case in which a Z-axis input is sensed using general sensor modules based on cameras or ultrasonic waves, however, the success rate of proximity space recognition is lowered due to resolution or a viewing angle.

DISCLOSURE

Technical Problem

It is an object of the present invention to provide a vehicle display device that is capable of improving user convenience.

It is another object of the present invention to provide a vehicle display device that is capable of achieving a high 3D gesture recognition rate.

The objects of the present invention are not limited to the above-mentioned objects, and other objects that have not been mentioned above will become evident to those skilled in the art from the following description.

Technical Solution

In order to accomplish the above objects, an embodiment of the present invention provides a vehicle display device including: a display; a gesture sensing unit disposed at the periphery of the display for generating a first sheet beam output in a first direction and a second sheet beam output in a second direction, which is different from the first direction, and sensing a three-dimensional gesture of an object through the first sheet beam and the second sheet beam; and a processor for providing a control signal in response to the three-dimensional gesture.

In order to accomplish the above objects, another embodiment of the present invention provides a vehicle including the vehicle display device.

The details of other embodiments are included in the following description and the accompanying drawings.

Advantageous Effects

The embodiments of the present invention have one or more effects as follows.

First, a 3D gesture is recognized using a plurality of sheet beams, thereby achieving a high recognition rate.

Second, a plurality of sheet beams coves the entire region of a display plane, thereby preventing the occurrence of a region in which a 3D gesture cannot be recognized.

Third, it is possible to provide a variety of simple human machine interfaces (HMIs) based on the recognition of a 3D gesture.

Fourth, it is possible for a driver to input a gesture during driving while looking forward, thereby achieving safe driving.

Effects of the present invention should not be limited to the aforementioned effects and other unmentioned effects will be clearly understood by those skilled in the art from the claims.

DESCRIPTION OF DRAWINGS

FIG. 1 is view a showing the external appearance of a vehicle having a vehicle display device according to an embodiment of the present invention;

FIG. 2 is a block diagram showing a vehicle display device according to an embodiment of the present invention;

FIGS. 3A and 3B are reference views illustrating sheet beams in accordance with an embodiment of the present invention;

FIGS. 4A to 4H are reference views illustrating a display and a gesture sensing unit according to an embodiment of the present invention;

FIGS. 5A and 5B are reference views illustrating the gesture sensing unit according to the embodiment of the present invention;

FIGS. 6A and 6B are reference views illustrating an infrared light source and a photodiode according to an embodiment of the present invention;

FIG. 7 is an exploded perspective view illustrating the structure of the gesture sensing unit according to the embodiment of the present invention;

FIG. 8 is a sectional view showing the gesture sensing unit of FIG. 7;

FIG. 9 is a reference view illustrating a process of forming a first sheet beam and a second sheet beam in accordance with an embodiment of the present invention;

FIG. 10 is a reference view illustrating the vehicle display device in the case in which a first gesture sensing unit and a second gesture sensing unit are included in accordance with an embodiment of the present invention;

FIGS. 11 to 14 are reference views illustrating the operation of the vehicle display device in response to the reception of a gesture in accordance with an embodiment of the present invention;

FIGS. 15A and 15B are reference views illustrating a touch input unit according to an embodiment of the present invention; and FIG. 16 is a block diagram showing a vehicle according to an embodiment of the present invention.

BEST MODE

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

The following description will be given based on a LHD vehicle, unless mentioned otherwise.

FIG. 1 is view a showing the external appearance of a vehicle having a vehicle display device according to an embodiment of the present invention.

Referring to the figure, the vehicle, designated by reference numeral 1, may include wheels 3FR, 3FL, 3RL . . . , which are rotated by a power source, steering input means 21a for controlling the direction of travel of the vehicle 1, and a vehicle display device 100.

The vehicle 1 may include a fossil fuel-based engine for supplying power or an electric motor for supplying power using a DC power source, such as a solar cell or a battery. In addition, the vehicle may include a transmission for converting the power from the engine into rotary power and a brake for stopping the advancement of the vehicle.

A vehicle display device 100 according to an embodiment of the present invention is a display device that is capable of performing 3D interaction. Proximity touch or space recognition is possible.

Meanwhile, in the following description, the X-axis may be the horizontal axis of the vehicle display device 100. For example, the X-axis may be the axis in the overall width direction of the vehicle 1.

In addition, the Y-axis may be the vertical axis of the vehicle display device 100. For example, the X-axis may be the axis in the overall height direction of the vehicle 1.

Furthermore, the Z-axis may be the axis that is perpendicular to the X-axis and to the Y-axis. For example, the Z-axis may be the axis in the overall length direction of the vehicle 1.

Meanwhile, the term "overall length" means the length from the front end to the rear end of the vehicle 1, the term "overall width" means the width of the vehicle 1, and the term "overall height" means the height from the bottom of the wheel to the roof. In the following description, the term "overall length direction L" may mean the reference direction for the measurement of the overall length of the vehicle 1, the term "overall width direction W" may mean the reference direction for the measurement of the overall width of the vehicle 1, and the term "overall height direction H" may mean the reference direction for the measurement of the overall height of the vehicle 1.

FIG. 2 is a block diagram showing the vehicle display device according to the embodiment of the present invention.

Referring to FIG. 2, the vehicle display device 100 may include a communication unit 110, a gesture sensing unit 120, a touch sensor unit 130, an input unit 140, an output unit 150, a memory 160, a processor 170, an interface unit 180, and a power supply unit 190.

The communication unit 110 may include one or more modules that enable wireless communication between the vehicle 1 and a mobile terminal 95, between the vehicle 1 and an external server 96, or between the vehicle 1 and another vehicle 97. In addition, the communication unit 110 may include one or more modules that enable the vehicle 1 to be connected to one or more networks.

The communication unit 110 may transmit a control signal generated by the processor 170 to the external devices 95, 96, and 97. In particular, the communication unit 110 may transmit a control signal generated by the processor 170 to the mobile terminal 95 through a short-range communication module 113. For example, the communication unit 110 may transmit a control signal for telephone conversation to the mobile terminal.

The communication unit 110 may include a broadcast reception module 111, a wireless Internet module 112, a short-range communication module 113, a location information module 114, and a V2X communication module 116.

The broadcast reception module 111 receives a broadcast signal or broadcast associated information from an external broadcast management server via a broadcast channel. Here, broadcast includes radio broadcast or TV broadcast.

The wireless Internet module 112 is a module for wireless Internet access. This module may be internally or externally coupled to the vehicle 1. The wireless Internet module 112 is configured to transmit and receive wireless signals via communication networks according to wireless Internet technologies.

Examples of such wireless Internet technologies include WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced). The wireless Internet module 112 transmits and receives data according to one or more of such wireless Internet technologies and other Internet technologies. For example, the wireless Internet module 112 may exchange data with the external server 96 in a wireless manner. The wireless Internet module 112 may receive weather information and road traffic state information (e.g. TPEG (Transport Protocol Expert Group) information) from the external server 96.

The short-range communication module 113 may support short-range communication using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, or Wireless USB (Wireless Universal Serial Bus).

The short-range communication module 113 may form wireless area networks to perform short-range communication between the vehicle 1 and at least one external device. For example, the short-range communication module 113 may exchange data with the mobile terminal 95 in a wireless manner. The short-range communication module 113 may receive weather information and road traffic state information (e.g. TPEG (Transport Protocol Expert Group) information) from the mobile terminal 95. When a user gets into the vehicle 1, the mobile terminal 95 of the user and the vehicle 1 may pair with each other automatically or as the result of the user executing a pairing application.

The location information module 114 is a module for acquiring the location of the vehicle 1. A representative example of the location information module 114 includes a GPS (Global Positioning System) module. For example, when the vehicle 1 utilizes the GPS module, the location of the vehicle 1 may be acquired using signals transmitted from GPS satellites.

The V2X communication module 116 is a module for performing wireless communication with the server 96 or the vehicle 97. The V2X communication module 116 includes a module capable of supporting a protocol for communication between vehicles (V2V) or communication between a vehicle and some infrastructure (V2I). The vehicle 1 may perform wireless communication with the external server 96 or the vehicle 97 via the V2X communication module 116.

The gesture sensing unit 120 may generate a first sheet beam and a second sheet beam. Here, the first sheet beam may be a beam that is output in a first direction and forms a first plane. Here, the second sheet beam may be a beam that is output in a second direction and forms a second plane, which is different from the first plane.

The first sheet beam may be referred to as a near-field sheet beam. The second sheet beam may be referred to as a far-field sheet beam.

Meanwhile, the first direction may be a direction in which a first angle is defined between a display 151 and the sheet beam in the Z-axis direction when the vehicle display device 100 is viewed from the side thereof. The second direction may be a direction in which a second angle is defined between the display 151 and the sheet beam in the Z-axis direction when the vehicle display device 100 is viewed from the side thereof.

The gesture sensing unit 120 may sense the three-dimensional gesture of an object using the first sheet beam and the second sheet beam. Here, the object may be a hand or a finger of a passenger riding in the vehicle 1.

The gesture sensing unit 120 may include a light output unit 121 and a light reception unit 122.

The light output unit 121 may output light. For example, the light output unit 121 may output infrared (IR) light. The light output unit 121 may include a plurality of infrared light sources for outputting infrared beams.

The light output unit 121 may generate a first sheet beam that is output in the first direction. The light output unit 121 may generate a second sheet beam that is output in the second direction, which is different from the first direction.

The light output unit 121 may include a first light emission unit 610 (see FIG. 5A) and a second light emission unit 620 (see FIG. 5A).

The first light emission unit 610 (see FIG. 5A) may include a plurality of infrared light sources. The infrared light sources may output beams in the first direction. The beams output from the infrared light sources in the first direction may be combined to form the first sheet beam.

The first light emission unit 610 (see FIG. 5A) may generate first light. The first light may be output to the outside as a first sheet beam via a first light guide 730 (see FIG. 7), a collimator 740 (see FIG. 7), and a prism unit 750 (see FIG. 7).

The second light emission unit 620 (see FIG. 5A) may include a plurality of infrared light sources. The infrared light sources may output beams in the second direction. The beams output from the infrared light sources in the second direction may be combined to form the second sheet beam.

The second light emission unit 620 (see FIG. 5A) may generate second light. The second light may be output to the outside as a second sheet beam via the first light guide 730 (see FIG. 7), the collimator 740 (see FIG. 7), and the prism unit 750 (see FIG. 7).

The light reception unit 122 may receive light. For example, the light reception unit 122 may receive infrared (IR) light. The light reception unit 122 may include a plurality of photodiodes for receiving infrared light. The light reception unit 122 may convert the light received through the photodiodes into an electrical signal. The converted electrical signal may be input to the processor 170.

The light reception unit 122 may receive a first reflected beam generated as the result of the first sheet beam being reflected or scattered by an object. The light reception unit 122 may receive a second reflected beam generated as the result of the second sheet beam being reflected or scattered by an object.

The first reflected beam may be referred to as a near-field reflected beam. The second reflected beam may be referred to as a far-field reflected beam.

Meanwhile, the infrared light sources, which are included in the light output unit 121, and the photodiodes, which are included in the light reception unit 122, may be alternately arranged.

The gesture sensing unit 120 will be described in more detail with reference to FIGS. 5A to 9.

The touch sensor unit 130 senses a floating touch and a direct touch. To this end, the touch sensor unit 130 may include an electrode array and an MCU. When the touch sensor unit 130 is operated, an electrical signal is supplied to the electrode array, whereby an electric field is formed on the electrode array.

The touch sensor unit 130 will be described in more detail with reference to FIGS. 15A and 15B.

The input unit 140 may include a user input unit 141 and a sound input unit 142.

The user input unit 141 is configured to receive information from a user. When information is input through the user input unit 141, the processor 170 may control the operation of the vehicle display device 100 according to the input information. The user input unit 141 may include a touch input unit or a mechanical input unit.

The sound input unit 142 may process an external sound signal into electrical data. The processed data may be variously utilized according to the function that is being performed by the vehicle display device 100. The sound input unit 142 may convert a user voice command into electrical data. The converted electrical data may be transmitted to the processor 170.

The output unit 150 is configured to output information processed by the processor 170. The output unit may include a display 151 and a sound output unit 152.

The display 151 may display information processed by the processor 170.

The display 151 may include at least one of a liquid crystal display (LCD), a thin film transistor-liquid crystal display (TFT LCD), an organic light-emitting diode (OLED), a flexible display, a three-dimensional display (3D display), or an e-ink display.

The display 151 may form an inter-layer structure together with a touch sensor, or may be integrally formed with the touch sensor to constitute a touchscreen. The touchscreen may function as the user input unit 141, which provides an input interface between the vehicle display device 100 and the user, and may provide an output interface between the vehicle display device 100 and the user. In this case, the display 151 may include a touch sensor for sensing a touch on the display 151 so as to receive a control command in a touch manner. When a touch is input to the display 151 as described above, the touch sensor may sense the touch, and the processor 170 may generate a control command corresponding to the touch. The content input in a touch manner may be characters or numbers, or may be instructions in various modes or menu items that may be designated.

Meanwhile, the display 151 may be configured such that a screen is displayed on a portion of a windshield.

The display device 141 may include a transparent display. In this case, the transparent display may be attached to the windshield. In this case, the vehicle display device 100 may output information through the transparent display.

The transparent display may display a predetermined screen with a predetermined transparency. In order to achieve the transparency, the transparent display may include at least one of a transparent Thin Film Electroluminescent (TFEL) display, a transparent Organic Light-Emitting Diode (OLED) display, a transparent Liquid Crystal Display (LCD), a transmissive transparent display, or a transparent Light-Emitting Diode (LED) display.

Meanwhile, the transparency of the transparent display may be adjustable under the control of the processor 170.

The display 151 may include a projection module. In this case, the display device 100 may output information through an image projected on the windshield.

The projection module projects a beam toward the windshield. The projection module may include a light source and a projection lens. The projection module may realize an image corresponding to information processed by the processor 170. That is, the projection module may realize an image using light generated from the light source, and may project the realized image on the windshield. An LED or a laser may be used as the light source.

The sound output unit 152 converts an electrical signal from the processor 170 into an audio signal and outputs the audio signal. To this end, the sound output unit 152 may include a speaker. The sound output unit 152 may output sound corresponding to the operation of the user input unit 141.

The memory 160 is electrically connected to the processor 170. The memory 160 may store basic data for each unit, control data for the operational control of each unit, and input/output data. The memory 160 may be any of various hardware storage devices, such as a ROM, a RAM, an EPROM, a flash drive, and a hard drive. The memory 160 may store various data for the overall operation of the display device 100, such as programs for the processing or control of the processor 170.

The memory 160 may store map data for realizing a navigation function. Here, the map data may be stored by default when the vehicle is delivered. Alternatively, the map data may be received from an external device through the communication unit 410 or the interface unit 180.

The processor 170 may control the overall operation of each unit in the vehicle display device 100.

The processor 170 may control the output unit 150 such that information or data received through the communication unit 110, the input unit 140, or the interface unit 180 is output. The processor 170 may control the output unit 150 such that information or data stored in the memory 160 is output.

The processor 170 may immediately output the received information or data. Alternatively, the processor 170 may output the received information or data being processed. The processor 170 may visually output information or data through the display 151. The processor 170 may aurally output information or data through the sound output unit 152.

Meanwhile, the processor 170 may generate new information based on the information or data received through the interface unit 180. The processor 170 may control the display 151 such that the generated information or a screen corresponding to the generated information is displayed.

Meanwhile, the processor 170 may generate and provided a control signal based on a three-dimensional gesture of an object sensed by the gesture sensing unit 120.

The processor 170 may calculate the position of the object in the plane that is parallel to the display 151 based on the amount of first reflected beam or the amount of second reflected beam received by the light reception device 122. Here, the plane that is parallel to the display 151 may be an XY plane.

The light reception unit 122 may include a plurality of photodiodes. The amounts of light received by the respective photodiodes may be different from each other. The processor 170 may calculate the position of the object in the XY plane based on the amounts of light received by the respective photodiodes and the first angle or the second angle.

The processor 170 may calculate the position of the object in the XY plane using the inverse relationship between the square of the amount of reflected light and the distance.

In addition, the processor 170 may calculate the position of the object in the XY plane using based on the first angle between the first sheet beam and the display 151 and the second angle between the second sheet beam and the display 151.

The processor 170 may calculate the approximate distance between the display 151 and the object based on the amount of first reflected beam and the amount of second reflected beam. Here, the distance between the display 151 and the object may be the distance on the Z axis.

The processor 170 may distinguish between the first reflected beam and the second reflected beam.

For example, the amount of first reflected beam and the amount of second reflected beam may have different ranges. It can be seen through experimentation that the amount of first reflected beam and the amount of second reflected beam have different distributions. That is, the amount of first reflected beam may have a first distribution, and the amount of second reflected beam may have a second distribution. The processor 170 may determine whether the reflected beam has the first distribution or the second distribution in order to determine whether the received reflected beam is the first reflected beam or the second reflected beam.

For example, the first reflected beam and the second reflected beam may have different frequencies. That is, the first reflected beam may have a first frequency, and the second reflected beam may have a second frequency. The reflected beam may have the same frequency as the output beam. The processor 170 may determine whether the reflected beam has the first frequency or the second frequency in order to determine whether the received reflected beam is the first reflected beam or the second reflected beam.

The processor 170 may receive a user input through the display 151. Specifically, when the display 151 forms an inter-layer structure together with a touch sensor or is integrally formed with the touch sensor to constitute a touchscreen, the processor 170 may receive a user input through the touchscreen.

When a first user input is received through the display 151, the processor 170 may set a first control signal provided when the second reflected beam is received according to the first user input.

When a second user input is received through the display 151, the processor 170 may set a second control signal provided when the first reflected beam and the second reflected beam are received according to the second user input.

For example, in the state in which a specific item has been highlighted, the processor 170 may generate a control signal for selecting the highlighted item or canceling the highlighted item depending on whether the first reflected beam or the second reflected beam has been received. Alternatively, in the state in which a specific item has been highlighted, the processor 170 may generate a control signal for performing a first function or a second function of the highlighted item depending on whether the first reflected beam or the second reflected beam has been received.

For example, when the first user input is received, the processor 170 may set such that whether the second reflected beam has been received matches the first control signal for selecting the highlighted item.

For example, when the first user input is received, the processor 170 may set such that whether the second reflected beam has been received matches the first control signal for performing the first function of the highlighted item.

For example, when the second user input is received, the processor 170 may set such that whether the first beam and the second reflected beam have been received matches the second control signal for canceling the highlighted item.

For example, when the second user input is received, the processor 170 may set such that whether the first beam and the second reflected beam have been received matches the second control signal for performing the second function of the highlighted item.

Meanwhile, when the second reflected beam is received, the processor 170 may provide the first control signal. In addition, when the first reflected beam and the second reflected beam are received, the processor 170 may provide the second control signal.

For example, when the second reflected beam is received in the state in which a specific item has been highlighted, the processor 170 may provide a control signal for selecting the highlighted item.

For example, when the second reflected beam is received in the state in which a specific item has been highlighted, the processor 170 may provide a control signal for performing the first function of the highlighted item.

For example, when the first reflected beam and the second reflected beam are received in the state in which a specific item has been highlighted, the processor 170 may provide a control signal for canceling the highlighted item.

For example, when the first reflected beam and the second reflected beam are received in the state in which a specific item has been highlighted, the processor 170 may provide a control signal for performing the second function of the highlighted item.

Meanwhile, in the state in which the second reflected beam has been received, the processor 170 may provide a first control signal depending on the movement of the sensed object.

In the state in which the second reflected beam has been received, the processor 170 may sense the movement of the object in the XY plane based on a change in the amount of second reflected beam received by the light reception unit 122 and the second angle. The processor 170 may provide a first control signal based on the movement of the object sensed in the XY plane.

Meanwhile, in the state in which the first reflected beam and the second reflected beam have been received, the processor 170 may provide a second control signal depending on the movement of the sensed object.

In the state in which the first reflected beam and the second reflected beam have been received, the processor 170 may sense the movement of the object in the XY plane based on a change in the amount of first reflected beam received by the light reception unit 122, a change in the amount of second reflected beam received by the light reception unit 122, the first angle, and the second angle. The processor 170 may provide a second control signal based on the movement of the object sensed in the XY plane.

The interface unit 180 may receive data, or may transmit a signal processed or generated by the processor 170 to the outside. To this end, the interface unit 180 may perform data communication with a controller 70 or a sensing unit 60 in the vehicle in a wired communication manner or in a wireless communication manner.

The interface unit 180 may receive sensor information from the controller 70 or the sensing unit 60.

Here, the sensor information may include at least one of vehicle direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, or in-vehicle humidity information.

The sensor information may be acquired from a heading sensor, a yaw sensor, a gyro sensor, a position module, a vehicle forward/reverse movement sensor, a wheel sensor, a vehicle speed sensor, a vehicle gradient sensor, a battery sensor, a fuel sensor, a tire sensor, a steering sensor based on the rotation of a steering wheel, an in-vehicle temperature sensor, or an in-vehicle humidity sensor. Meanwhile, the position module may include a GPS module for receiving GPS information.

Meanwhile, among the sensor information, the vehicle direction information, the vehicle location information, the vehicle angle information, the vehicle speed information, and the vehicle tilt information, which are related to the travel of the vehicle, may be referred to as vehicle travel information.

The interface unit 180 may transmit a control signal generated by the processor 170 to the outside. For example, the interface unit 180 may transmit a control signal generated by the processor 170 to at least one of a power source driving unit 51 (see FIG. 16), a lamp driving unit 54 (see FIG. 16), an air conditioner driving unit 55 (see FIG. 16), a window driving unit 56 (see FIG. 16), a door driving unit 48 (see FIG. 16), a sunroof driving unit 58 (see FIG. 16), or a wiper driving unit 49 (see FIG. 16).

The power supply unit 190 may supply power required to operate the respective components under the control of the processor 170. In particular, the power supply unit 190 may receive power from a battery inside the vehicle.

FIGS. 3A and 3B are reference views illustrating sheet beams in accordance with an embodiment of the present invention.

FIG. 3A is a perspective view of the vehicle display device 100 according to the embodiment of the present invention, and FIG. 3B is a side view of the vehicle display device 100 according to the embodiment of the present invention.

Referring to FIGS. 3A and 3B, the gesture sensing unit 120 may generate a first sheet beam 310 and a second sheet beam 320. Here, the first sheet beam may be output in the first direction, and the second sheet beam may be output in the second direction. In addition, the first sheet beam may form the first plane, and the second sheet beam may form the second plane.

The first sheet beam may be referred to as a near-field sheet beam. The second sheet beam may be referred to as a far-field sheet beam.

Meanwhile, the first direction may be a direction in which a first angle $\alpha$ is defined between a display 151 and the sheet beam in the Z-axis direction when the vehicle display device 100 is viewed from the side thereof. The second direction may be a direction in which a second angle $\beta$ is defined between the display 151 and the sheet beam in the Z-axis direction when the vehicle display device 100 is viewed from the side thereof.

The gesture sensing unit 120 may include a first light emission unit 610 (see FIG. 5A) and a second light emission unit 620 (see FIG. 5A).

The first light emission unit 610 (see FIG. 5A) may include a plurality of infrared light sources. The infrared light sources included in the first light emission unit may output beams in the first direction. The first sheet beam is formed by combining the beams output in the first direction.

The second light emission unit 620 (see FIG. 5A) may include a plurality of infrared light sources. The infrared light sources included in the second light emission unit may output beams in the second direction. The second sheet beam is formed by combining the beams output in the second direction.

Meanwhile, the first reflected beam is a beam generated as the result of the first sheet beam 310 being reflected or scattered by an object 300. The first reflected beam may have the same frequency as the first sheet beam 310. The light reception unit 122 may receive the first reflected beam.

In addition, the second reflected beam is a beam generated as the result of the second sheet beam 320 being reflected or scattered by the object 300. The second reflected beam may have the same frequency as the second sheet beam 320. The light reception unit 122 may receive the second reflected beam.

FIGS. 4A to 4H are reference views illustrating the display and the gesture sensing unit according to the embodiment of the present invention.

FIG. 4A is a front view of the vehicle display device 100 according to the embodiment of the present invention, and FIG. 4B is an exploded perspective view of the vehicle display device 100 according to the embodiment of the present invention.

Referring to FIGS. 4A and 4B, the vehicle display device 100 may be divided into a display region 102 and a display periphery region 101 corresponding to an edge region around the display region.

The display 151 and the touch sensor unit 130 may be disposed in the display region 102. A bezel frame 103 and a gesture sensing unit 120D may be disposed in the display periphery region 101.

In the figures, the gesture sensing unit 120D is shown as being disposed at the portion of the display periphery region 101 that is adjacent to the lower end of the display 151.

Alternatively, various modifications are possible. In the figures, the gesture sensing unit 120D may be coupled to the light output unit 121 and the light reception unit 122 in order to constitute a module.

Meanwhile, referring to FIG. 4B, the touch sensor unit 130 is illustrated as being disposed under an overlay 106, and the display 151 is illustrated as being disposed under the touch sensor unit 130.

A user's finger may touch the overlay 106. In order to sense capacitance, the overlay 106 may include a conductive element. The overlay 106 may contact the touch sensing unit 130. In particular, the overlay 106 may contact the electrode array in the touch sensing unit 130.

Meanwhile, the area of the touch sensing unit 130 may be equal to the area of the display 151. Consequently, it is possible to sense a touch input over the overall region of the display 151.

Meanwhile, the touch sensor unit 130 according to the embodiment of the present invention may sense not only a direct touch on the display device 100 but also the approach of a user's finger within a predetermined distance. This may be referred to as a floating touch or hovering. The following description will be given based on the floating touch.

FIGS. 4C to 4H illustrate various embodiments in which the gesture sensing unit 120 is disposed.

As illustrated in FIGS. 4C and 4D, a gesture sensing unit 120U may be disposed at the portion of the display periphery region 101 that is adjacent to the upper end of the display 151.

As illustrated in FIGS. 4E and 4F, a gesture sensing unit 120L may be disposed at the portion of the display periphery region 101 that is adjacent to the left end of the display 151.

As illustrated in FIGS. 4G and 4H, a gesture sensing unit 120R may be disposed at the portion of the display periphery region 101 that is adjacent to the right end of the display 151.

FIGS. 5A and 5B are reference views illustrating the gesture sensing unit according to the embodiment of the present invention.

Referring to FIGS. 5A and 5B, the gesture sensing unit 120 may include a light output unit 121 and a light reception unit 122.

The light output unit 121 may include a first light emission unit 610 and a second light emission unit 620.

The first light emission unit 610 may include a plurality of infrared light sources 610a, 610b, 610c, 610d, 610e, 610f, and 610g. The infrared light sources 610a, 610b, 610c, 610d, 610e, 610f, and 610g may output beams 310a, 310b, 310c, 310d, 310e, 310f, and 310g in the first direction.

The beams 310a, 310b, 310c, 310d, 310e, 310f, and 310g output in the first direction may be combined to form a first sheet beam 310.

The second light emission unit 620 may include a plurality of infrared light sources 620a, 620b, 620c, 620d, 620e, 620f, and 620g. The infrared light sources 620a, 620b, 620c, 620d, 620e, 620f, and 620g may output beams 320a, 320b, 320c, 320d, 320e, 320f, and 320g in the second direction.

The beams 320a, 320b, 320c, 320d, 320e, 320f, and 320g output in the second direction may be combined to form a second sheet beam 320.

The light reception unit 122 may include a plurality of photodiodes 630a, 630b, 630c, 630d, 630e, 630f, 630g, 630h, 630i, 630j, 630k, 630l, 630m, and 630n. The photodiodes 630a, 630b, 630c, 630d, 630e, 630f, 630g, 630h, 630i, 630j, 630k, 630l, 630m, and 630n may receive a first reflected beam or a second reflected beam. Here, the first reflected beam may be a beam generated as the result of the first sheet beam 310 being reflected or scattered by an object. In addition, the second reflected beam may be a beam generated as the result of the second sheet beam 320 being reflected or scattered by the object.

Meanwhile, the infrared light sources 610a, 610b, 610c, 610d, 610e, 610f, 610g, 620a, 620b, 620c, 620d, 620e, 620f, and 620g, which are included in the light output unit 121, and the photodiodes 630a, 630b, 630c, 630d, 630e, 630f, 630g, 630h, 630i, 630j, 630k, 630l, 630m, and 630n, which are included in the light reception unit 122, may be alternately arranged on a board 720 (see FIG. 7).

FIGS. 6A and 6B are reference views illustrating an infrared light source and a photodiode according to an embodiment of the present invention.

FIG. 6A is a sectional view illustrating a light source 610. The light source 610 may be disposed between noise cutting frames 109 on the bezel frame 103. As the light source 610 is disposed between the noise cutting frames 109, the straightness of light output from the light source 610 is improved. Each noise cutting frame 109 may have a predetermined tilt from the overlay 106 toward the light source 610. The tilt may guide the direction of light emitted from the light source 610. The tilt may be set depending on the direction in which light is output. For example, the tilt when light is output in the first direction and the tilt when light is output in the second direction may be set to be different from each other.

Meanwhile, the overlay 106 and a light filter unit 107 may be disposed on the light source 610 and the noise cutting frames 109.

FIG. 6B is a sectional view illustrating a photodiode 620. The photodiode 620 may be disposed between the noise cutting frames 109 on the bezel frame 103. As the photodiode 620 is disposed between the noise cutting frames 109, the reception performance of light received by the photodiode 620 may be improved. Each noise cutting frame 109 may have a predetermined tilt from the overlay 106 toward the photodiode 620. The tilt may guide reflected light or scattered light in order to improve the light reception performance of the photodiode 620.

Meanwhile, the overlay 106 and the light filter unit 107 may be disposed on the photodiode 620 and the noise cutting frames 109.

FIG. 7 is an exploded perspective view illustrating the structure of the gesture sensing unit according to the embodiment of the present invention. FIG. 8 is a sectional view showing the gesture sensing unit of FIG. 7.

The embodiment of FIGS. 7 and 8 will be described on the assumption that the gesture sensing unit is disposed at the lower end of the display 151. In the case in which the gesture sensing unit is disposed at the upper end, the left end, or the right end of the display 151, however, the following description that will be given with reference to FIGS. 7 and 8 may be appropriately applied thereto.

In the following description, the front end or the rear end may be defined based on the path of light. The light generated by the light output unit 121 is output along the path of light defined by a first light guide 730, a collimator 740, a prism unit 750, and a frame 770, which are sequentially arranged. Consequently, the first light guide 730 may be disposed at the rear end of the light output unit 121, the collimator 740 may be disposed at the rear end of the first light guide 730, the prism unit 750 may be disposed at the rear end of the collimator 740, and the frame 770 may be disposed at the rear end of the prism unit 750.

Referring to FIGS. 7 and 8, the gesture sensing unit 120 may include a housing 710, a board 720, a first light guide 730, a collimator 740, a prism unit 750, and a frame 770.

The housing 710 may define the external appearance of the gesture sensing unit 210. The board 720, the first light guide 730, the collimator 740, and the prism unit 750 may be received in the housing 710.

The housing 710 may be provided in one side thereof with an opening 711. The frame 770 may be coupled into the opening 711.

The frame 770 may provided therein with an opening 711, through which the first sheet beam and the second sheet beam generated by the light output unit 121 may be output to the outside. In addition, the first reflected beam and the second reflected beam may reach the light reception unit 122 through the opening.

The light output unit 121 and the light reception unit 122 may be mounted on the board 720.

The first light guide 720 may be disposed at the rear end of the board 720. The first light guide 720 may guide the light generated by the light output unit 121 to the collimator 740.

Light may be totally reflected in the first light guide 720. To this end, the inside of the first light guide may be formed of optical glass, and the outside of the optical glass may be formed of a covering material (clad).

The collimator 740 may be disposed at the rear end of the first light guide 720.

The collimator 740 may convert incident light into parallel light depending on the incidence angle thereof.

The collimator 740 may convert the light generated by the first light emission unit 610 (see FIG. 5) into parallel light. The light generated by the first light emission unit 610 (see FIG. 5) may be transmitted to the prism unit 750 via the collimator 740.

The collimator 740 may directly transmit the light generated by the second light emission unit 620 (see FIG. 5) without conversion into parallel light. In this case, the light generated by the second light emission unit 620 (see FIG. 5) may be refracted while passing through the collimator 740. The light generated by the second light emission unit 620 (see FIG. 5) may be transmitted to the prism unit 750 via the collimator 740.

The collimator 740 may be formed of glass or polycarbonate.

The prism unit 750 may be disposed at the rear end of the collimator 740. The prism unit 750 may be formed of glass or polycarbonate.

The prism unit 750 may output the light that has been generated by the first light emission unit 610 (see FIG. 5) and passed through the collimator 740 in the first direction.

The prism unit 750 may output the light that has been generated by the second light emission unit 620 (see FIG. 5) and passed through the collimator 740 in the second direction.

The prism unit 750 may include a half mirror unit 751 and a mirror unit 752.

The half mirror unit 751 may reflect or transmit incident light depending on the incidence angle thereof. For example, the half mirror unit 751 may reflect light having an incidence angle equal to or greater than a reference value. In addition, the half mirror unit 751 may transmit light having an incidence angle less than the reference value.

The half mirror unit 751 may reflect the light that has been generated by the first light emission unit 610 (see FIG. 5) and passed through the collimator 740 in the first direction. In addition, the half mirror unit 751 may reflect the light that has been generated by the second light emission unit 620 (see FIG. 5) and passed through the collimator 740 in a third direction.

The half mirror unit 751 may be formed by half-mirror-coating glass or polycarbonate with a metal oxide.

The mirror unit 752 may reflect the light, reflected in the third direction, in the second direction.

The mirror unit 752 may be formed by mirror-coating glass or polycarbonate with a metal. Here, the metal may include mercury, platinum, titanium, and silver.

Referring to FIG. 8, a first surface of the first light guide 730 may be formed so as to be convex toward the collimator 740 when viewed from the side thereof.

A first surface of the collimator 740 may be formed so as to be concave toward the first light guide 730. A second surface of the collimator 740, which is opposite the first surface of the collimator 740, may be formed so as to be flat.

A first surface of the prism unit 750 may be formed so as to be concave toward the collimator 740.

The first light guide 730, the collimator 740, and the prism unit 750 may be formed so as to appropriately change the path of light. The first light guide 730, the collimator 740, and the prism unit 750 may be deformed to change the incidence angle of light incident on the half mirror unit 751 and the mirror unit 752 and thus to change the first angle $\alpha$ (see FIG. 3B) and the second angle $\beta$ (see FIG. 3B).

The prism unit 750 may include a second light guide 753, a half mirror unit 751, a mirror lens 754, and a mirror unit 752. The second light guide 753 and the half mirror unit 751 may be integrally formed, and the mirror lens 754 and the mirror unit 752 may be integrally formed.

The second light guide 753 may be disposed at the rear end of the collimator 740. The second light guide 753 may guide light to the half mirror unit 751. The inside of the second light guide 753 may be formed of optical glass, and the outside of the optical glass may be formed of a covering material (clad).

One surface of the second light guide 753 may be formed of the half mirror unit 751. The half mirror unit 751 may be formed by half-mirror-coating one surface of the second light guide 753, which is formed of glass or polycarbonate, with a metal oxide.

The half mirror unit 751 may be formed so as to have a third angle $\gamma$ with respect to the ground. As a result, the half mirror unit 751 may reflect the light that has been generated by the first light emission unit 610 (see FIG. 5) and has passed through the collimator 740 in the first direction. In addition, the half mirror unit 751 may transmit the light that has been generated by the second light emission unit 620 (see FIG. 5) and has passed through the collimator 740 in the third direction.

Meanwhile, the third angle $\gamma$ may be changed to change the reflection angle from the half mirror unit 751 and the mirror unit 752 and thus to change the first angle $\alpha$ (see FIG. 3B) and the second angle $\beta$ (see FIG. 3B).

The mirror lens 754 may be disposed at the rear end of the second light guide 753. The mirror lens 754 may transmit the light that has been transmitted through the half mirror unit 751. The mirror lens 754 may be formed of glass or polycarbonate.

When viewed from the side thereof, one surface of the mirror lens 754 may be formed so as to contact the half mirror unit 751. One surface of the mirror lens 754 may be formed of the mirror unit 752. The mirror unit 752 may be formed by mirror-coating one surface of the mirror lens 754 with a metal. Here, the metal may include mercury, platinum, titanium, and silver.

The mirror unit 752 may have a third angle $\gamma$ with respect to one surface of the mirror lens 754 that contacts the half mirror unit 751. In this case, the mirror unit 752 may be formed so as to be parallel to the ground.

As a result, the mirror unit 752 may reflect the light, reflected in the third direction, in the second direction.

FIG. 9 is a reference view illustrating a process of forming a first sheet beam and a second sheet beam in accordance with an embodiment of the present invention.

Referring to FIG. 9, the gesture sensing unit 120 may include a housing 710, a light output unit 121, a light reception unit 122, a board 720, a first light guide 730, a collimator 740, a prism unit 750, and a frame 770.

A first surface 731 of the first light guide 730 may be formed so as to be convex toward the collimator 740 when viewed from the side thereof.

A first surface 741 of the collimator 740 may be formed so as to be concave toward the first light guide 730. A second surface 742 of the collimator 740, which is opposite the first surface 741 of the collimator 740, may be formed so as to be flat.

A first surface 755 of the prism unit 750 may be formed so as to be concave toward the collimator 740.

The first surface 731 of the first light guide 730, the first surface 741 and the second surface 742 of the collimator 740, and the first surface 755 of the prism unit 750 may serve as lenses for refracting or diffusing light.

Meanwhile, the prism unit 750 may include a second light guide 753, a half mirror unit 751, a mirror lens 754, and a mirror unit 752. The second light guide 753 and the half mirror unit 751 may be integrally formed, and the mirror lens 754 and the mirror unit 752 may be integrally formed.

The light output unit 121 and the light reception unit 122 may be mounted on the board 720.

The light output unit 121 may output light. For example, the light output unit 121 may output infrared (IR) light. The light output unit 121 may include a plurality of infrared light sources for outputting infrared beams.

The light output unit 121 may include a first light emission unit 610 (see FIG. 5A) and a second light emission unit 620 (see FIG. 5A).

The first light emission unit 610 (see FIG. 5A) may generate a plurality of first beams 910. The first beams 910 may be output to the outside as a first sheet beam 310 via the first light guide 730, the collimator 740, and the prism unit 750.

Specifically, the first beams 910 may be output to the collimator 740 while being guided by the first light guide 730. At this time, the first beams 910 may be refracted while being transmitted through the first surface 731 of the first light guide 730.

The first beams 910 may be converted into parallel beams while being transmitted through the first surface 741 and the second surface 742 of the collimator 740. The converted first beams 910 may be output to the prism unit 750.

The first beams 910 may be refracted while being transmitted through the first surface 755 of the prism unit 750. The first beams 910 that have been transmitted through the first surface 755 of the prism unit 750 may reach the half mirror unit 751 via the second light guide 753.

The first beams 910 that have reached the half mirror unit 751 may be reflected by the half mirror unit 751.

The first beams 910 that have been reflected by the half mirror unit 751 may be refracted in the first direction while passing through the second surface 756 of the prism unit 750, and may be output to the outside. The first beams 910 that have been output to the outside may be combined to form a first sheet beam 310.

The second light emission unit 620 (see FIG. 5A) may generate a plurality of second beams 920. The second beams 920 may be output to the outside as a second sheet beam via the first light guide 730, the collimator 740, and the prism unit 750.

Specifically, the second beams 920 may be output to the collimator 740 while being guided by the first light guide 730. At this time, the second beams 920 may be refracted while being transmitted through the first surface 731 of the first light guide 730.

The second beams 920 are transmitted through the first surface 741 and the second surface 742 of the collimator 740. At this time, the incidence angle of the second beams 920 does not satisfy the condition in which the second beams 920 are converted into parallel beams by the collimator 740. Consequently, the second beams 920 are not converted into parallel beams. The second beams 920 may refracted while being transmitted through the first surface 741 and the second surface 742 of the collimator 740. The second beams 920 may be output to the prism unit 750.

The second beams 920 may be refracted while being transmitted through the first surface 755 of the prism unit 750. The second beams 920 that have been transmitted through the first surface 755 of the prism unit 750 may reach the half mirror unit 751 via the second light guide 753.

The second beams 920 that have reached the half mirror unit 751 may be transmitted through the half mirror unit 751. The reason for this is that the incidence angle of the second beams 920 does not satisfy the reflection condition of the half mirror unit 751

The second beams 920 that have been transmitted through the half mirror unit 751 may be output in the third direction. The second beams 920 that have been output in the third direction may be reflected by the mirror unit 752.

The second beams 920 that have been reflected by the mirror unit 752 may be refracted in the second direction while passing through a third surface 757 of the prism unit 750, and may be output to the outside. The second beams 920 that have been output to the outside may be combined to form a second sheet beam 320.

Meanwhile, the third surface 757 of the prism unit 750 may be formed at one surface of the mirror lens 754.

FIG. 10 is a reference view illustrating the vehicle display device in the case in which a first gesture sensing unit and a second gesture sensing unit are included in accordance with an embodiment of the present invention.

Referring to FIG. 10, the gesture sensing unit may include a first gesture sensing unit 120a and a second gesture sensing unit 120b.

As described with reference to FIGS. 1 to 9, the first gesture sensing unit 120a may generate a first sheet beam 310 and a second sheet beam 320.

The second gesture sensing unit 120b may generate a third sheet beam 1010 and a second sheet beam 1020. Here, the third sheet beam 1010 may be output in the third direction, which is different from the first direction and the second direction. The third sheet beam 1010 may form a third plane. In addition, the fourth sheet beam 1020 may be output in a fourth direction, which is different from the first to third directions. The fourth sheet beam 1020 may form a fourth plane.

Meanwhile, the second gesture sensing unit 120b may be disposed at the upper end or the lower end of the first gesture sensing unit 120a.

Meanwhile, in some embodiments, the gesture sensing unit 120 may be disposed at the left end or the right end of the display 151. In this case, the second gesture sensing unit 120b may be disposed at the left end or the right end of the first gesture sensing unit 120a.

FIGS. 11 to 14 are reference views illustrating the operation of the vehicle display device in response to the reception of a gesture in accordance with an embodiment of the present invention.

A first reflected beam is a beam generated as the result of a first sheet beam 310 being reflected or scattered by an object 1100. A second reflected beam is a beam generated as the result of a second sheet beam 320 being reflected or scattered by the object 1100.

When a second reflected beam is received in the state in which a specific menu or item is highlighted, the processor 170 (see FIG. 2) may provide a first control signal.

When a first reflected beam and a second reflected beam are received in the state in which a specific menu or item is highlighted, the processor 170 (see FIG. 2) may provide a second control signal.

Referring to FIG. 11, the vehicle display device 100 may pair with the mobile terminal 95 through the short-range communication module 113. The vehicle display device 100 may receive a telephone list from the mobile terminal 95 and may display the received telephone list on the display 151.

When a second reflected beam is received in the state in which one 1131 among the telephone list is highlighted, the processor 170 (see FIG. 2) may provide a first control signal for telephone conversation with the highlighted one 1131.

Specifically, the processor 170 (see FIG. 2) may display the highlighted one 1131 on the display 151 (see FIG. 2). In this case, a hand 1110 of a user touches a second sheet beam 320, whereby a second reflected beam may be generated. The light reception unit 122 (see FIG. 2) may receive the second reflected beam. When the second reflected beam is received, the processor 170 (see FIG. 2) may generate a first control signal for telephone conversation with the highlighted one 1131. The generated first control signal may be transmitted to the mobile terminal 95 (see FIG. 2) through the short-range communication module 113 (see FIG. 2). The mobile terminal 95 (see FIG. 2) may call the one 1131. At this time, the processor 170 (see FIG. 2) may display an indicator 1132 indicating the telephone conversation on the display 151 (see FIG. 2).

When a first reflected beam and a second reflected beam are received in the state in which one 1131 among the telephone list is highlighted, the processor 170 (see FIG. 2) may provide a second control signal for sending text to the highlighted one 1131.

Specifically, the processor 170 (see FIG. 2) may display the highlighted one 1131 on the display 151 (see FIG. 2). In this case, a hand 1110 of a user touches a first sheet beam 310 and a second sheet beam 320, whereby a first reflected beam and a second reflected beam may be generated. The light reception unit 122 (see FIG. 2) may receive the first reflected beam and the second reflected beam. When the first reflected beam and the second reflected beam are received, the processor 170 (see FIG. 2) may generate a second control signal for sending a text message to the highlighted one 1131. The generated second control signal may be transmitted to the mobile terminal 95 (see FIG. 2) through the short-range communication module 113 (see FIG. 2). The mobile terminal 95 (see FIG. 2) may enter a message writing mode for writing a message to be sent to the one 1131. At this time, the processor 170 (see FIG. 2) may display an indicator 1133 indicating the text message writing mode on the display 151 (see FIG. 2).

Referring to FIG. 12, the vehicle display device 100 may provide a control signal to the air conditioner driving unit 55 (see FIG. 16) through the interface unit 180.

When a second reflected beam is received in the state in which an air conditioning menu is selected, the processor 170 (see FIG. 2) may provide a first control signal for selecting temperature control among the selected air conditioning menu.

Specifically, the processor 170 (see FIG. 2) may display an icon 1231 indicating the selected air conditioning menu on the display 151 (see FIG. 2). In this case, a hand 1110 of a user touches a second sheet beam 320, whereby a second reflected beam may be generated. The light reception unit 122 (see FIG. 2) may receive the second reflected beam. When the second reflected beam is received, the processor 170 (see FIG. 2) may generate a first control signal for selecting temperature control among the air conditioning menu. The generated first control signal may be transmitted to the air conditioner driving unit 55 (see FIG. 16) through the interface unit 180. At this time, the processor 170 (see FIG. 2) may display an indicator 1232 indicating the temperature control on the display 151 (see FIG. 2).

When a first reflected beam and a second reflected beam are received in the state in which the air conditioning menu is selected, the processor 170 (see FIG. 2) may provide a second control signal for selecting airflow control among the selected air conditioning menu.

Specifically, the processor 170 (see FIG. 2) may display an icon 1231 indicating the selected air conditioning menu on the display 151 (see FIG. 2). In this case, a hand 1110 of a user touches a first sheet beam 310 and a second sheet beam 320, whereby a first reflected beam and a second reflected beam may be generated. The light reception unit 122 (see FIG. 2) may receive the first reflected beam and the second reflected beam. When the first reflected beam and the second reflected beam are received, the processor 170 (see FIG. 2) may generate a second control signal for selecting airflow control among the air conditioning menu. The generated second control signal may be transmitted to the air conditioner driving unit 55 (see FIG. 16) through the interface unit 180. At this time, the processor 170 (see FIG. 2) may display an indicator 1233 indicating the airflow control on the display 151 (see FIG. 2).

Referring to FIG. 13, when a second reflected beam is received in the state in which an AV (Audio Video) menu is selected, the processor 170 (see FIG. 2) may provide a first control signal for selecting radio among the selected AV content menu.

Specifically, the processor 170 (see FIG. 2) may display an icon 1331 indicating the selected AV menu on the display 151 (see FIG. 2). In this case, a hand 1110 of a user touches a second sheet beam 320, whereby a second reflected beam may be generated. The light reception unit 122 (see FIG. 2) may receive the second reflected beam. When the second reflected beam is received, the processor 170 (see FIG. 2) may generate a first control signal for selecting radio among the AV content. The processor 170 (see FIG. 2) may select the radio among the AV content according to the first control signal. At this time, the processor 170 (see FIG. 2) may display an indicator 1332 indicating the radio on the display 151 (see FIG. 2).

When a first reflected beam and a second reflected beam are received in the state in which the AV menu is selected, the processor 170 (see FIG. 2) may provide a second control signal for selecting MP3 among the selected AV content menu.

Specifically, the processor 170 (see FIG. 2) may display an icon 1331 indicating the selected AV menu on the display 151 (see FIG. 2). In this case, a hand 1110 of a user touches a first sheet beam 310 and a second sheet beam 320, whereby a first reflected beam and a second reflected beam may be generated. The light reception unit 122 (see FIG. 2) may receive the first reflected beam and the second reflected beam. When the first reflected beam and the second reflected beam are received, the processor 170 (see FIG. 2) may generate a second control signal for selecting MP3 among the selected AV content menu. The processor 170 (see FIG. 2) may select the MP3 among the AV content according to the second control signal. At this time, the processor 170 (see FIG. 2) may display an indicator 1333 indicating the MP3 on the display 151 (see FIG. 2).

Referring to FIG. 14, when a second reflected beam is received in the state in which a navigation menu is selected, the processor 170 (see FIG. 2) may provide a first control signal for selecting a destination setting menu among the selected navigation menu.

Specifically, the processor 170 (see FIG. 2) may display an icon 1431 indicating the selected navigation menu on the display 151 (see FIG. 2). In this case, a hand 1110 of a user touches a second sheet beam 320, whereby a second reflected beam may be generated. The light reception unit 122 (see FIG. 2) may receive the second reflected beam. When the second reflected beam is received, the processor 170 (see FIG. 2) may generate a first control signal for selecting a destination setting menu among the navigation menu. The processor 170 (see FIG. 2) may select the destination setting menu among the navigation menu according to the first control signal. At this time, the processor 170 (see FIG. 2) may display an indicator 1432 indicating the destination setting menu on the display 151 (see FIG. 2).

When a first reflected beam and a second reflected beam are received in the state in which the navigation menu is selected, the processor 170 (see FIG. 2) may provide a second control signal for selecting a route setting menu among the selected destination menu.

Specifically, the processor 170 (see FIG. 2) may display an icon 1431 indicating the selected navigation menu on the display 151 (see FIG. 2). In this case, a hand 1110 of a user touches a first sheet beam 310 and a second sheet beam 320, whereby a first reflected beam and a second reflected beam may be generated. The light reception unit 122 (see FIG. 2) may receive the first reflected beam and the second reflected beam. When the first reflected beam and the second reflected beam are received, the processor 170 (see FIG. 2) may generate a second control signal for selecting a route setting menu. The processor 170 (see FIG. 2) may select the route setting menu among the navigation menu according to the second control signal. At this time, the processor 170 (see FIG. 2) may display an indicator 1432 indicating the route setting menu on the display 151 (see FIG. 2).

FIGS. 15A and 15B are reference views illustrating a touch input unit according to an embodiment of the present invention.

First, FIG. 15A illustrates a portion of an electrode array 1510 in the touch sensor unit 130.

The electrode array 1510 may include horizontal electrodes Ex1, Ex2, Ex3, and Ex4 and vertical electrodes Ey1, Ey2, Ey3, Ey4, Ey5, and Ey6.

Referring to FIG. 15A, particularly, four electrode cells (Electrode group A) sense a change in capacitance. A signal indicating the change in capacitance sensed by the electrode cells is muxed by a MUX 1520, is converted into a digital signal by an ADC 1530, and is signal-processed by an MCU 1540.

The MCU 1540 may calculate X-axis, Y-axis, and Z-axis information about a floating touch input based on the converted digital signal.

Meanwhile, in the case in which the size of a touch sensing cell (a grouping electrode) corresponds to the size of the four electrode cells, as shown in FIG. 15A, the MCU 1540 may apply an electrical signal only to the first horizontal electrode Ex1 and the third horizontal electrode Ex3 of the horizontal electrodes Ex1, Ex2, Ex3, and Ex4, and may apply an electrical signal only to the first, third, and fifth vertical electrodes Ey1, Ey3, and Ey5 of the vertical electrodes Ey1, Ey2, Ey3, Ey4, Ey5, and Ey6. As a result, the size of the touch sensing cell (the grouping electrode) may be set so as to correspond to the size of the four electrode cells.

Meanwhile, the MCU 1540 may be included in the processor 170.

Meanwhile, the size of the touch sensing cell (the grouping electrode) may be variously set to 1×1, 2×2, 3×3, or 2×7 depending on the position of a hand or a finger of a user.

Next, FIG. 15B illustrates a change in capacitance sensed by the electrode array 1510 in the touch sensor unit 130.

In the figure, signals 1551, 1552, 1553, and 1554 indicating a change in capacitance are illustrated as being sensed by a plurality of electrode cells (Electrode groups A, B, C, D in time division. The MUX 1520 may mux these signals 1551, 1552, 1553, and 1554, and may output a muxed analog signal.

The vehicle display device 100 according to the embodiment of the present invention is a display device that is capable of performing 3D interaction. Proximity touch or space recognition is possible.

Particularly, when the a hand of a user sequentially approaches in the state in which being located at the front of the vehicle display device 100 according to the embodiment of the present invention, the vehicle display device 100 may recognize all routes, sections, and positions of the hand of the user (Hand detection) until a touch input is performed, and may recognize the finger of the user when the distance to the hand is within a predetermined distance (Finger detection). Consequently, it is possible to solve a problem in which the success rate of proximity space recognition is lowered due to resolution or a viewing angle. Here, the predetermined distance may be a distance in which a floating touch is possible.

To this end, the gesture sensing unit 120 (see FIG. 2) may be included, and the touch sensing unit 130 (see FIG. 2) for detecting a finger of the user, i.e. sensing a floating touch, may be included.

The processor 170 may calculate the position of an object on a plane that is parallel to the display 151 based on the amount of first reflected beam or the amount of second reflected beam received by the light reception unit 122. Here, the plane that is parallel to the display 151 may be an XY plane.

The processor 170 may calculate the approximate distance between the display 151 and the object based on the amount of first reflected beam and the amount of second reflected beam. Here, the distance between the display 151 and the object may be a distance on the Z-axis.

Meanwhile, when the first reflected beam and the second reflected beam are received, the touch sensor unit 130 may be powered on. That is, in the case in which the hand of the user does not approach within the distance in which the first reflected beam and the second reflected beam are received, the touch sensor unit 130 is not operated. Consequently, it is possible to reduce unnecessary power consumption.

The touch sensor unit 130 may sense a floating touch. To this end, the touch sensor unit may include an electrode array and an MCU. When the touch sensor unit is operated, an electrical signal is supplied to the electrode array, whereby an electric field is formed in the electrode array.

Meanwhile, when the hand of the user approaches within the distance in which a floating touch is possible, a change in capacitance occurs in the electric field formed on the front surface of the display device 100, which is sensed by the touch sensor unit 130. X-axis and Y-axis information of the floating touch input may be calculated based on the sensed change in capacitance. In addition, Z-axis information, which is the distance between the display device 100 and the hand of the user, may be calculated based on the intensity of change in capacitance.

At this time, it is possible to change grouping of the electrode array in the touch sensor unit 130 based on the information about the distance between the display device 100 and the hand of the user calculated based on the gesture sensing unit 120 (see FIG. 2), i.e. the Z-axis information. Setting may be performed such that the smaller the distance to the display 151, the smaller the size of the electrode array group.

That is, it is possible to change the size of the touch sensing cell relative to the electrode array in the touch sensor unit 130 based on the information about the distance between the display device 100 and the hand of the user calculated based on the gesture sensing unit 120 (see FIG. 2), i.e. the Z-axis information.

For example, when a first reflected beam and a second reflected beam are received, the size of the touch sensing cell (the grouping electrode) may be a size corresponding to nine electrode cells, as a first size, by grouping of the electrode array. When only a second reflected beam is received, the size of the touch sensing cell (the grouping electrode) may be a size corresponding to four electrode cells, as a second size.

In another example, when a first reflected beam and a second reflected beam are received, the size of the touch sensing cell (the grouping electrode) may be a size corresponding to four electrode cells, as a first size, by grouping of the electrode array. When only a second reflected beam is received, the size of the touch sensing cell (the grouping electrode) may be a size corresponding to one electrode cell, as a second size.

That is, setting may be performed such that the smaller the distance to the display 151, the smaller the size of the touch sensing cell.

Meanwhile, the size of the touch sensing cell (the grouping electrode) may be changed by changing an electrical signal that is applied to the electrode array.

For example, when the size of the touch sensing cell (the grouping electrode) is a size corresponding to nine electrode cells, an electrical signal may be applied only to the first horizontal electrode and the fourth horizontal electrode of the first to fourth horizontal electrodes and only to the first vertical electrode and the fourth vertical electrode of the first to fourth vertical electrodes in order to set the size of the touch sensing cell (the grouping electrode) corresponding to the size of nine electrode cells.

In another example, when the size of the touch sensing cell (the grouping electrode) is a size corresponding to four electrode cells, an electrical signal may be applied only to the first horizontal electrode and the third horizontal electrode of the first to third horizontal electrodes and only to the first vertical electrode and the third vertical electrode of the first to third vertical electrodes in order to set the size of the touch sensing cell (the grouping electrode) corresponding to the size of four electrode cells.

In a further example, when the size of the touch sensing cell (the grouping electrode) is a size corresponding to one electrode cell, an electrical signal may be applied to each horizontal electrode and to each vertical electrode in order to set the size of the touch sensing cell (the grouping electrode) corresponding to the size of one electrode cell.

That is, the magnitude of power that is consumed by the electrode array in the touch sensor unit 130 depending on the distance to the hand of the user may vary. The smaller the distance to the hand of the user, the larger the magnitude of power that is consumed by the electrode array in the touch sensor unit 130.

FIG. 16 is a block diagram showing a vehicle according to an embodiment of the present invention.

The vehicle 1 may include a communication unit 10, an input unit 20, a sensing unit 60, an output unit 40, a vehicle driving unit 50, a memory 30, an interface unit 80, a controller 70, a power supply unit 90, a driver assistance device 100, and a vehicle display device 100.

The communication unit 10 may include one or more modules that enable wireless communication between the vehicle 1 and a mobile terminal 95, between the vehicle 1 and an external server 96, or between the vehicle 1 and another vehicle 97. In addition, the communication unit 10 may include one or more modules that enable the vehicle 1 to be connected to one or more networks.

The communication unit 10 may include a broadcast reception module 11, a wireless Internet module 12, a short-range communication module 13, a location information module 14, an optical communication module 15, and a V2X communication module 16.

The broadcast reception module 11 receives a broadcast signal or broadcast associated information from an external broadcast management server via a broadcast channel. Here, broadcast includes radio broadcast or TV broadcast.

The wireless Internet module 12 is a module for wireless Internet access. This module may be internally or externally coupled to the vehicle 1. The wireless Internet module 12 is configured to transmit and receive wireless signals via communication networks according to wireless Internet technologies.

Examples of such wireless Internet technologies include WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced). The wireless Internet module 12 transmits and receives data according to one or more of such wireless Internet technologies and other Internet technologies. For example, the wireless Internet module 12 may exchange data with the external server 96 in a wireless manner. The wireless Internet module 12 may receive weather information and road traffic state information (e.g. TPEG (Transport Protocol Expert Group) information) from the external server 96.

The short-range communication module 13 may support short-range communication using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, or Wireless USB (Wireless Universal Serial Bus).

The short-range communication module 13 may form wireless area networks to perform short-range communication between the vehicle 1 and at least one external device. For example, the short-range communication module 13 may exchange data with the mobile terminal 95 in a wireless manner. The short-range communication module 13 may receive weather information and road traffic state information (e.g. TPEG (Transport Protocol Expert Group) information) from the mobile terminal 95. When a user gets into the vehicle 1, the mobile terminal 95 of the user and the vehicle 1 may pair with each other automatically or as the result of the user executing a pairing application.

The location information module 14 is a module for acquiring the location of the vehicle 1. A representative example of the location information module 14 includes a GPS (Global Positioning System) module. For example, when the vehicle 1 utilizes the GPS module, the location of the vehicle 1 may be acquired using signals transmitted from GPS satellites.

The optical communication module 15 may include a light emission unit and a light reception unit.

The light reception unit may convert light into electrical signals so as to receive information. The light reception unit may include photodiodes (PDs) for receiving light. The photodiodes may convert light into electrical signals. For example, the light reception unit may receive information regarding a preceding vehicle from light emitted from a light source included in the preceding vehicle.

The light emission unit may include at least one light emitting element for converting electrical signals into light. Here, the light emitting element may be a light emitting diode (LED). The light emission unit converts electrical signals into light to thereby emit the light. For example, the light emission unit may externally emit light by flashing the light emitting element at a predetermined frequency. In some embodiments, the light emission unit may include an array of light emitting elements. In some embodiments, the light emission unit may be integrated with a lamp provided in the vehicle 1. For example, the light emission unit may be at least one of a headlight, a taillight, a brake light, a turn signal light, or a sidelight. For example, the optical communication module 15 may exchange data with the vehicle 97 through optical communication.

The V2X communication module 16 is a module for performing wireless communication with the server 96 or the vehicle 97. The V2X communication module 16 includes a module capable of supporting a protocol for communication between vehicles (V2V) or communication between a vehicle and some infrastructure (V2I). The vehicle 1 may perform wireless communication with the external server 96 and the vehicle 97 via the V2X communication module 16.

The input unit 20 may include a driving operation means 21, a camera 22, a microphone 23, and a user input unit 24.

The driving operation means 21 receives a user input for driving of the vehicle 1. The driving operation means 21 may include a steering input means 21a, a shift input means 21b, an acceleration input means 21c, and a brake input means 21d.

The steering input means 21a receives a user input with regard to the direction of travel of the vehicle 1. The steering input means 21a may take the form of a wheel to enable a steering input through the rotation thereof. In some embodiments, the steering input means 21a may be configured as a touchscreen, a touch pad, or a button.

The shift input means 21b receives an input for selecting one of Park (P), Drive (D), Neutral (N), and Reverse (R) gears of the vehicle 1 from the user. The shift input means 21b may take the form of a lever. In some embodiments, the shift input means 21b may be configured as a touchscreen, a touch pad, or a button.

The acceleration input means 21c receives a user input for acceleration of the vehicle 1. The brake input means 21d receives a user input for deceleration of the vehicle 1. Each of the acceleration input means 21c and the brake input means 21d may take the form of a pedal. In some embodiments, the acceleration input means 21c or the brake input means 21d may be configured as a touchscreen, a touch pad, or a button.

The camera 22 may include an image sensor and an image processing module. The camera 22 may process a still image or a motion image acquired by the image sensor (for example, CMOS or CCD). The image processing module may process the still image or the motion image acquired by the image sensor to extract necessary information, and may transmit the extracted information to the controller 70. Meanwhile, the vehicle 1 may include a camera 22 for capturing an image in front of the vehicle or an image around the vehicle and an inner camera 22c for capturing an image inside the vehicle.

The inner camera 22c may acquire an image of passengers. The inner camera 22c may acquire an image for biometric recognition of the passengers.

The inner camera 22c may acquire an image of the passengers in the vehicle 1 in order to detect the number of passengers.

The microphone 23 may process external sound signals into electrical data. The processed data may be utilized in various ways in accordance with the function that the vehicle 1 is performing. The microphone 23 may convert a user voice command into electrical data. The converted electrical data may be transmitted to the controller 70.

Meanwhile, in some embodiments, the camera 22 or the microphone 23 may be a component included in the sensing unit 60, rather than a component included in the input unit 20.

The user input unit 24 is configured to receive information from the user. When information is input through the user input unit 24, the controller 70 may control the operation of the vehicle 1 according to the input information. The user input unit 24 may include a touch input unit or a mechanical input unit. In some embodiments, the user input unit 24 may be located in the region of the steering wheel. In this case, the driver may operate the user input unit 24 with the fingers while gripping the steering wheel.

The sensing unit 60 may sense a signal related to the travel of the vehicle 1. To this end, the sensing unit 60 may include a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, a radar, and a lidar.

Consequently, the sensing unit 60 may acquire sensing signals with regard to vehicle collision information, vehicle direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, and steering-wheel rotation angle information.

Meanwhile, the sensing unit 60 may further include an accelerator pedal sensor, a pressure sensor, an engine speed sensor, an air flow-rate sensor (AFS), an air temperature sensor (ATS), a water temperature sensor (WTS), a throttle position sensor (TPS), a top dead center (TDC) sensor, and a crank angle sensor (CAS).

The sensing unit 60 may include a biometric recognition information sensing unit. The biometric recognition information sensing unit senses and acquires biometric recognition information of the passengers. The biometric recognition information may include fingerprint information, iris-scan information, retina-scan information, hand geometry information, facial recognition information, and voice recognition information. The biometric recognition information sensing unit may include a sensor for sensing the biometric recognition information of the passengers. Here, the inner camera 22c and the microphone 23 may be operated as sensors. The biometric recognition information sensing unit may acquire hand geometry information and facial recognition information through the inner camera 22c.

The output unit 40 is configured to output information processed by the controller 70. The output unit 40 may include a display 41, a sound output unit 42, and a haptic output unit 43.

The display 41 may display information processed by the controller 70. For example, the display 41 may display vehicle-associated information. Here, the vehicle-associated information may include vehicle control information for the direct control of the vehicle or driver assistance information to guide the driver in driving the vehicle. In addition, the vehicle-associated information may include vehicle state information indicating the current state of the vehicle or vehicle traveling information regarding the traveling of the vehicle.

The display 41 may include at least one of a liquid crystal display (LCD), a thin film transistor-liquid crystal display (TFT LCD), an organic light-emitting diode (OLED), a flexible display, a three-dimensional display (3D display), or an e-ink display.

The display 41 may form an inter-layer structure together with a touch sensor, or may be integrally formed with the touch sensor to constitute a touchscreen. The touchscreen may function as the user input unit 24, which provides an input interface between the vehicle 1 and the user, and may provide an output interface between the vehicle 1 and the user. In this case, the display 41 may include a touch sensor for sensing a touch on the display 41 so as to receive a control command in a touch manner. When a touch is input to the display 41 as described above, the touch sensor may sense the touch, and the controller 70 may generate a control command corresponding to the touch. The content input in a touch manner may be characters or numbers, or may be instructions in various modes or menu items that may be designated.

Meanwhile, the display 41 may include a cluster for allowing the driver to check vehicle state information or vehicle traveling information while driving the vehicle. The cluster may be located on a dashboard. In this case, the driver may check information displayed on the cluster while looking forward.

Meanwhile, in some embodiments, the display 41 may be implemented as a head up display (HUD). When the display 41 is implemented as a HUD, information may be output through a transparent display provided on a windshield. Alternatively, the display 41 may include a projection module in order to output information through an image projected on the windshield.

The sound output unit 42 converts electrical signals from the controller 70 into audio signals and outputs the audio signals. To this end, the sound output unit 42 may include a speaker. The sound output unit 42 may output sound corresponding to the operation of the user input unit 24.

The haptic output unit 43 generates a tactile output. For example, the haptic output unit 43 may operate to vibrate a steering wheel, a safety belt, or a seat so as to allow the user to recognize the output thereof.

The vehicle driving unit 50 may control the operation of various devices of the vehicle. The vehicle driving unit 50 may include a power source driving unit 51, a steering driving unit 52, a brake driving unit 53, a lamp driving unit 54, an air conditioner driving unit 55, a window driving unit 56, an airbag driving unit 57, a sunroof driving unit 58, and a suspension driving unit 59.

The power source driving unit 51 may perform electronic control of a power source inside the vehicle 1.

For example, in the case in which a fossil fuel-based engine (not shown) is the power source, the power source driving unit 51 may perform electronic control of the engine. As such, the power source driving unit 51 may control the output torque of the engine. In the case in which the power source driving unit 51 is such an engine, the power source driving unit 51 may limit the speed of the vehicle by controlling the output torque of the engine under the control of the controller 70.

In another example, when an electric motor (not shown) is the power source, the power source driving unit 51 may perform control of the motor. As such, the power source driving unit 51 may control the RPM and torque of the motor.

The steering driving unit 52 may perform electronic control of a steering apparatus inside the vehicle 1. As such, the steering driving unit 52 may change the direction of travel of the vehicle.

The brake driving unit 53 may perform electronic control for a brake apparatus (not shown) inside the vehicle 1. For example, the brake driving unit 53 may reduce the speed of the vehicle 1 by controlling the operation of brakes located at wheels. In another example, the brake driving unit 53 may adjust the direction of travel of the vehicle 1 leftward or rightward by differently operating respective brakes located at left and right wheels.

The lamp driving unit 54 may turn lamps, arranged inside or outside the vehicle, on or off. In addition, the lamp driving unit 54 may control the intensity and radiation direction of the light from the lamps. For example, the lamp driving unit 54 may perform control for a turn-signal lamp or a brake lamp.

The air conditioner driving unit 55 may perform electronic control of an air conditioner (not shown) inside the vehicle 1. For example, when the interior temperature of the vehicle is high, the air conditioner driving unit 55 may operate the air conditioner so as to supply cool air to the interior of the vehicle.

The window driving unit 56 may perform electronic control of a window apparatus inside the vehicle 1. For example, the window driving unit 56 may control the opening or closing of left and right windows of the vehicle.

The airbag driving unit 57 may perform electronic control of an airbag apparatus inside the vehicle 1. For example, the airbag driving unit 57 may perform control such that an airbag is deployed in a dangerous situation.

The sunroof driving unit 58 may perform electronic control of a sunroof apparatus (not shown) inside the vehicle 1. For example, the sunroof driving unit 58 may control the opening or closing of a sunroof.

The suspension driving unit 59 may perform electronic control of a suspension apparatus (not shown) inside the vehicle 1. For example, when the road surface is uneven, the suspension driving unit 59 may control the suspension apparatus in order to reduce the vibration of the vehicle 1 when the surface of a load is irregular.

The memory 300 is electrically connected to the controller 70. The memory 30 may store basic data for each unit, control data for the operational control of each unit, and input/output data. The memory 30 may be any of various hardware storage devices, such as a ROM, a RAM, an EPROM, a flash drive, and a hard drive. The memory 30 may store various data for the overall operation of the vehicle 1, such as programs for the processing or control of the controller 70.

The interface unit 80 may serve as a passage for various kinds of external devices that are connected to the vehicle 1. For example, the interface unit 80 may have a port that is connectable to the mobile terminal 95, and may be connected to the mobile terminal 95 via the port. In this case, the interface unit 80 may exchange data with the mobile terminal 95.

Meanwhile, the interface unit 80 may serve as a passage for the supply of electrical energy to the mobile terminal 95 connected thereto. When the mobile terminal 95 is electrically connected to the interface unit 80, the interface unit 80 may provide electrical energy, supplied from the power supply unit 90, to the mobile terminal 95 under the control of the controller 70.

The controller 70 may control the overall operation of each unit inside the vehicle 1. The controller 70 may be referred to as an electronic control unit (ECU).

The controller 70 may be implemented in a hardware manner using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, pr electric units for the implementation of other functions.

The power supply unit 90 may supply power required to operate the respective components under the control of the controller 70. In particular, the power supply unit 90 may receive power from a battery (not shown) inside the vehicle 1.

The vehicle display device 100 may exchange data with the controller 70. The controller 70 may receive first information from the vehicle display device 100 or an additional navigation device (not shown). Here, the first information may be GPS-based vehicle location information. The first information may include set destination information, route information based on the destination, map information related to the traveling of the vehicle, or the vehicle location information.

The vehicle display device according to the embodiment of the present invention may not be limitedly applied to the construction and method of the embodiments as previously described; however, all or some of the embodiments may be selectively combined to achieve various modifications.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g. data transmission over the Internet). In addition, the computer may include a processor 170 or 470 or a controller 770. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

The invention claimed is:

1. A vehicle display device comprising:
   a display;
   a gesture sensing unit disposed at a periphery of the display for generating a first sheet beam output in a first direction and a second sheet beam output in a second direction, which is different from the first direction, and sensing a three-dimensional gesture of an object through the first sheet beam and the second sheet beam; and
   a processor for providing a control signal in response to the three-dimensional gesture,
   wherein the gesture sensing unit comprises:
      a light output unit for generating the first sheet beam and the second sheet beam, wherein the light output unit comprises a first light emission unit for generating the first sheet beam and a second light emission unit for generating the second sheet beam,
      a light reception unit for receiving a first reflected beam generated as a result of the first sheet beam being reflected by the object and a second reflected beam generated as a result of the second sheet beam being reflected by the object,
      a collimator for transmitting light generated by the first light emission unit and for converting light generated by the second light emission unit into parallel light, and
      a prism unit for outputting light that has been generated by the first light emission unit and has passed through the collimator in the first direction and for outputting light that has been generated by the second light emission unit and has passed through the collimator in the second direction.

2. The vehicle display device according to claim 1, wherein
   the light output unit comprises a plurality of infrared light sources,
   the light reception unit comprises a plurality of photodiodes, and
   the light sources and the photodiodes are alternately arranged.

3. The vehicle display device according to claim 1, wherein the prism unit comprises:
   a half mirror unit for reflecting the light that has been generated by the first light emission unit and has passed through the collimator in the first direction and for transmitting the light that has been generated by the second light emission unit and has passed through the collimator in a third direction; and
   a mirror unit for reflecting the light, reflected in the third direction, in the second direction.

4. The vehicle display device according to claim 1, wherein the light output unit further comprises a light guide for guiding the light generated by the first light emission unit and the second light emission unit to the collimator.

5. The vehicle display device according to claim 1, wherein the processor calculates a position of the object in a plane parallel to the display based on an amount of the first reflected beam or an amount of the second reflected beam, received by the light reception unit.

6. The vehicle display device according to claim 1, wherein the processor calculates a distance between the display and the object based on an amount of the first reflected beam and an amount of the second reflected beam.

7. The vehicle display device according to claim 1, wherein the gesture sensing unit is disposed at an upper end, a lower end, a left end, or a right end of the display.

8. A vehicle display device comprising:
a display;
a gesture sensing unit disposed at a periphery of the display for generating a first sheet beam output in a first direction and a second sheet beam output in a second direction, which is different from the first direction, and sensing a three-dimensional gesture of an object through the first sheet beam and the second sheet beam; and
a processor for providing a control signal in response to the three-dimensional gesture,
wherein the gesture sensing unit comprises:
a first gesture sensing unit for generating the first sheet beam and the second sheet beam; and
a second gesture sensing unit for generating a third sheet beam to be output in a third direction, which is different from the first direction and the second direction, and a fourth sheet beam to be output in a fourth direction, which is different from the first to third directions.

9. The vehicle display device according to claim 8, wherein the second gesture sensing unit is disposed at an upper end or a lower end of the first gesture sensing unit.

10. The vehicle display device according to claim 1, wherein the processor sets:
a first control signal provided when the second reflected beam is received in response to a first user input received through the display; and
a second control signal provided when the first reflected beam and the second reflected beam are received in response to a second user input received through the display.

11. A vehicle display device comprising:
a display;
a gesture sensing unit disposed at a periphery of the display for generating a first sheet beam output in a first direction and a second sheet beam output in a second direction, which is different from the first direction, and sensing a three-dimensional gesture of an object through the first sheet beam and the second sheet beam; and
a processor for providing a control signal in response to the three-dimensional gesture,
wherein the gesture sensing unit comprises:
a light output unit for generating the first sheet beam and the second sheet beam, and
a light reception unit for receiving a first reflected beam generated as a result of the first sheet beam being reflected by the object and a second reflected beam generated as a result of the second sheet beam being reflected by the object,
wherein the processor provides:
a first control signal when the second reflected beam is received; and
a second control signal when the first reflected beam and the second reflected beam are received.

12. The vehicle display device according to claim 1, wherein the processor provides:
a first control signal in response to a movement of the object sensed in a state in which the second reflected beam has been received; and
a second control signal in response to a movement of the object sensed in a state in which the first reflected beam and the second reflected beam have been received.

13. The vehicle display device according to claim 1, further comprising an interface unit for transmitting a control signal generated by the processor to an outside.

14. The vehicle display device according to claim 13, wherein the interface unit transmits the control signal for driving at least one of a power source of the vehicle, a lamp of the vehicle, an air conditioner of the vehicle, a window of the vehicle, a door of the vehicle, a sunroof of the vehicle, or a wiper of the vehicle.

15. The vehicle display device according to claim 13, further comprising a communication unit for transmitting the control signal generated by the processor to an external device.

16. The vehicle display device according to claim 15, wherein
the external device is a mobile terminal, and
the communication unit transmits the control signal for telephone conversation to the mobile terminal.

17. A vehicle comprising the vehicle display device according to claim 1.

* * * * *